US005450208A

United States Patent [19]

Murata

[11] Patent Number: 5,450,208
[45] Date of Patent: Sep. 12, 1995

[54] IMAGE PROCESSING METHOD AND IMAGE PROCESSING APPARATUS

[75] Inventor: Kazuyuki Murata, Tsuzuki, Japan

[73] Assignee: Matsushita Electric Industrial Co., Ltd., Osaka, Japan

[21] Appl. No.: 158,710

[22] Filed: Nov. 29, 1993

[30] Foreign Application Priority Data

Nov. 30, 1992 [JP] Japan .................................. 4-319683
Mar. 23, 1993 [JP] Japan .................................. 5-063693

[51] Int. Cl.$^6$ ............................................. H04N 1/21
[52] U.S. Cl. ................................................. 358/296
[58] Field of Search ............... 358/298, 296, 300, 302; 346/108, 160; 382/54, 25, 27, 49, 55, 22, 56

[56] References Cited

U.S. PATENT DOCUMENTS

| 4,361,394 | 11/1982 | Sakai et al. | 355/3 R |
| 4,437,122 | 3/1984 | Walsh et al. | 358/166 |
| 4,847,641 | 7/1989 | Tung | 346/154 |
| 5,131,058 | 7/1992 | Ting et al. | 382/47 |
| 5,249,242 | 9/1993 | Hanson et al. | 382/54 |

FOREIGN PATENT DOCUMENTS

57-85086 5/1982 Japan .
4268867 9/1982 Japan .

*Primary Examiner*—Mark J. Reinhart
*Attorney, Agent, or Firm*—Renner, Otto, Boisselle & Sklar

[57] ABSTRACT

The image processing apparatus for smoothing edges in a reproduced image includes an image data generating circuit for generating image data including a specified pixel and a plurality of pixels surrounding the specified pixel; a sub-pixel data generating circuit for dividing the specified pixel included in the image data into N sub-pixels, for detecting the condition of the specified pixel and the condition of the plurality of pixels surrounding the specified pixel included in the image data by matching the image data with a plurality of predetermined patterns, and for generating sub-pixel data for determining the number and position of sub-pixels to be exposed of the N sub-pixels, based on the condition of the specified pixel and the condition of the plurality of pixels surrounding the specified pixel; and supplying circuit for supplying the sub-pixel data to exposure circuit which makes exposure. The sub-pixel data generating circuit generates sub-pixel data for exposing M sub-pixels of the N sub-pixels, when the specified pixel is detected to be an exposed pixel which requires no exposure correction, where M is smaller than N.

22 Claims, 16 Drawing Sheets

TEMPLATE
PATTERN

GENERATED
SUB-PIXEL DATA

IMAGE PROCESSING METHOD AND IMAGE PROCESSING APPARATUS

BACKGROUND OF THE INVENTION

1. Field of the Invention

The present invention relates to a technique for reproducing an image based on an image signal obtained by scanning each line, utilized in an electro-photographic printer such as a laser printer, or an LED printer with an LED array head, a CRT, or the like. More particularly, the present invention relates to an image processing method and an image processing apparatus for smoothing jagged edges of characters, etc., and for stably reproducing thin lines and isolated dots, so as to achieve an image reproduction of high quality and to achieve an ideal tone characteristic by correcting the tone characteristic of digital halftone images.

2. Description of the Related Art

There are two conventional methods for improving an image quality by smoothing edges of images reproduced by a printer or a CRT. In the first method, image data of higher resolution is generated, so that the resolution of the image reproduction apparatus is increased.

However, this method costs much because it necessitates a memory with larger capacity for storing the generated image data. Moreover, it costs more because the exposure system should have a higher accuracy for the image reproduction apparatus with the increased resolution.

The second method is disclosed in U.S. Pat. No. 4,847,641 to Tung et al. entitled "PIECE-WISE PRINT IMAGE ENHANCEMENT FOR DOT MATRIX PRINTERS", published on Jul. 11, 1989.

An image processing apparatus utilizing the second method will be described below with reference to FIGS. 33, 34A to 34D, and 35.

FIG. 33 shows a configuration of a conventional image processing apparatus for smoothing edges. A bit map image signal 100 obtained by raster scan is input into a pixel window scanning circuit 101. The pixel window scanning circuit 101 includes a line buffer memory for affecting a line delay and a shift register for affecting a pixel delay. The pixel window scanning circuit 101 outputs data 102 of M×N pixels. In the M×N pixels, the center pixel is a pixel to be processed. The data 102 of M×N pixels are input into a pattern matching and corrected image signal generating circuit 103 in which a plurality of predetermined patterns are compared with the data 102. If the data 102 match any one of the patterns, a pattern match signal 106 is made to be active. When the pattern match signal 106 is active, the pattern matching and corrected image signal generating circuit 103 outputs corrected center pixel data 105.

The corrected center pixel data 105 and non-corrected center pixel data 104 are input into a selector 107. When the pattern match signal 106 is active, the selector 107 selects the corrected center pixel data 105. The output 108 of the selector 107 is used as a modulation signal for a semiconductor laser in a laser printer.

Next, how the edges are smoothed in the above conventional image processing apparatus will be described below.

FIG. 34A shows input image data. When the edge smoothing is not to be performed, the laser modulation signal for the input image data is shown by solid lines in FIG. 34B. Even if it is considered that the spot shape of a laser beam is circular, the reproduced image has jagged edges as shown in FIG. 34C.

When the edge smoothing is to be performed, pixels corresponding to portions A, B, C, D, E, and F in FIG. 34A are detected by pattern matching, so that the laser modulation signal is corrected. For example, a template pattern shown in FIG. 35 is compared with data of 9×9 pixels in which the center pixel is a pixel to be processed. In FIG. 35, a dot meshing pixel indicates a pixel which is not cared for during the comparison, a hatched pixel indicates an exposed pixel, and a white pixel indicates a non-exposed pixel. If the comparison results in matching, the center pixel data in which the pixel is not exposed to laser light is replaced by data in which the right half of the pixel is exposed to laser light, as is shown in FIG. 36. The template pattern of FIG. 35 matches the data for processing the pixel E in FIG. 34A. A plurality of types of template patterns such as that shown in FIG. 35 are prepared. When the data to be processed matches any one of the template patterns, the center pixel data is replaced so as to smooth the jagged edges. For example, the center pixel data is replaced so as to have a corrected laser modulation signal shown by dotted lines in FIG. 34B. As is shown in FIG. 34D, the reproduced image based on the corrected laser signal has less lagged edges. In this way, an image with higher resolution can be obtained.

However, in cases where an isolated dot consisting of 1 pixel or a thin line of 1-pixel width is to be reproduced by using the above edge smoothing method, since the shape of the exposure beam spot has a broad profile such as Gaussian distribution, the reproduced thin line may not be clear or may be thinner, and the isolated dot cannot be accurately reproduced. In order to reproduce thin lines and isolated dots, it is necessary to set a large value for the exposure energy per one pixel. However, with such a method, there were problems such as the fattening of font images and the smothering out of font images.

Moreover, according to the conventional edge smoothing process, the exposure energy density per one pixel for a pixel to be exposed cannot be made higher than in the case where the smoothing process is not performed, so that there arises a problem in that a sufficient edge smoothing effect cannot be obtained.

If the input image data is a digital halftone image, the conventional edge smoothing process has such drawbacks that a pseudo-contour and a moire may occur and that the tone characteristic may be degraded. In a conventional method for eliminating the above drawbacks of the edge smoothing process for the digital halftone image, the edge smoothing process is manually prohibited or the edge smoothing effect is manually attenuated. However, such a method requires manipulation by an operator, and in cases where font images and digital halftone images co-exist in the input image data, this method is not at all applicable.

Furthermore, the digital halftone image digitally represents the halftone in accordance with the ratio of black dots, so that the image density (or reflectance) reproduced by the printer should have a linear relationship to the black dot density. However, in the usual printer, the relationship between the black dot density and the reproduced image density is non-linear, so that it is difficult to accurately reproduce the halftone image with high quality.

SUMMARY OF THE INVENTION

The image processing method for smoothing edges in a reproduced image of the present invention includes the steps of generating image data including a specified pixel and a plurality of pixels surrounding the specified pixel; dividing the specified pixel included in the image data into N sub-pixels; detecting the condition of the specified pixel and the condition of the plurality of pixels surrounding the specified pixel included in the image data by matching the image data with a plurality of predetermined patterns; generating sub-pixel data for determining the number and position of sub-pixels to be exposed of the N sub-pixels, based on the condition of the specified pixel and the condition of the plurality of pixels surrounding the specified pixel; and supplying the sub-pixel data to exposure circuit which makes exposure, wherein the step of generating sub-pixel data includes a step of generating sub-pixel data for exposing M sub-pixels of the N sub-pixels, when the specified pixel is detected to be an exposed pixel which requires no exposure correction, M being smaller than N.

In one embodiment of the invention, the step of generating sub-pixel data includes the step of generating sub-pixel data for exposing L sub-pixels of the N sub-pixels, when the specified pixel is detected to be an exposed pixel and to be included in a thin line, L being larger than M.

In another embodiment of the invention, the step of generating sub-pixel data includes the step of generating sub-pixel data for exposing L sub-pixels of the N sub-pixels, when the specified pixel is detected to be an exposed pixel and to be an isolated dot pixel, L being larger than M.

In another embodiment of the invention, the step of generating sub-pixel data includes a step of generating sub-pixel data for exposing I sub-pixels of the N sub-pixels, when the specified pixel is detected to be adjacent to a non-exposed pixel included in a reversed thin line, I being smaller than M.

In another embodiment of the invention, the step of generating sub-pixel data includes a step of generating sub-pixel data for exposing I sub-pixels of the N sub-pixels, when the specified pixel is detected to be adjacent to a non-exposed pixel of a reversed isolated dot, I being smaller than M.

In another aspect of the present invention, an image processing apparatus for smoothing edges in a reproduced image includes: an image data generating circuit for generating image data including a specified pixel and a plurality of pixels surrounding the specified pixel; a sub-pixel data generating circuit for dividing the specified pixel included in the image data into N sub-pixels, for detecting the condition of the specified pixel and the condition of the plurality of pixels surrounding the specified pixel included in the image data by matching the image data with a plurality of predetermined patterns, and for generating sub-pixel data for determining the number and position of sub-pixels to be exposed of the N sub-pixels, based on the condition of the specified pixel and the condition of the plurality of pixels surrounding the specified pixel; and a supplying circuit for supplying the sub-pixel data to exposure circuit which makes exposure, wherein the sub-pixel data generating circuit generates sub-pixel data for exposing M sub-pixels of the N sub-pixels, when the specified pixel is detected to be an exposed pixel which requires no exposure correction, M being smaller than N.

In one embodiment of the invention, the sub-pixel data generating circuit generates sub-pixel data for exposing L sub-pixels of the N sub-pixels, when the specified pixel is detected to be an exposed pixel and to be included in a thin line, L being larger than M.

In another embodiment of the invention, the sub-pixel data generating circuit generates sub-pixel data for exposing L sub-pixels of the N sub-pixels, when the specified pixel is detected to be an exposed pixel and to be an isolated dot pixel, L being larger than M.

In another embodiment of the invention, the sub-pixel data generating circuit generates sub-pixel data for exposing I sub-pixels of the N sub-pixels, when the specified pixel is detected to be adjacent to a non-exposed pixel included in a reversed thin line, I being smaller than M.

In another embodiment of the invention, the sub-pixel data generating circuit generates sub-pixel data for exposing I sub-pixels of the N sub-pixels, when the specified pixel is detected to be adjacent to a non-exposed pixel of a reversed isolated dot, I being smaller than M.

In another embodiment of the invention, the image processing apparatus further includes a circuit for switching a first mode for outputting the sub-pixel data from the sub-pixel data generating circuit in serial and a second mode for outputting the sub-pixel data from the sub-pixel data generating circuit sequentially by each separate line.

In another aspect of the present invention, an image processing apparatus for smoothing edges in a reproduced image includes: an image data generating circuit for generating image data including a specified pixel and a plurality of pixels surrounding the specified pixel; a first sub-pixel data generating circuit for dividing the specified pixel included in the image data into N sub-pixels, for detecting the condition of the specified pixel and the condition of the plurality of pixels surrounding the specified pixel included in the image data by matching the image data with a plurality of predetermined patterns, and for generating first sub-pixel data for determining the number and position of sub-pixels to be exposed of the N sub-pixels, based on the condition of the specified pixel and the condition of the plurality of pixels surrounding the specified pixel; an average density calculating circuit for calculating an average density of the image data; a second sub-pixel data generating circuit for dividing the specified pixel included in the image data into N sub-pixels, and for generating second sub-pixel data for determining the number and position of sub-pixels to be exposed of the N sub-pixels, based on the condition of the specified pixel and the average density of the image data calculated by the average density calculating circuit; a judging circuit for judging whether the image data includes at least one of dense regions of exposed pixels and dense regions of non-exposed pixels or not; a selecting circuit, receiving the first sub-pixel data and the second sub-pixel data, for selecting the first sub-pixel data when the judging circuit judges that the image data includes at least one of dense regions of exposed pixels and dense regions of non-exposed pixels, and for selecting the second sub-pixel data when the judging circuit judges that the image data includes none of dense regions of exposed pixels and dense regions of non-exposed pixels; and a supplying circuit for supplying one of the first sub-pixel data and the second sub-pixel data selected by the selecting circuit to exposure circuit which makes exposure.

In one embodiment of the invention, the first sub-pixel data generating circuit generates sub-pixel data for exposing M sub-pixels of the N sub-pixels, when the specified pixel is detected to be an exposed pixel which requires no exposure correction, M being smaller than N.

In another embodiment of the invention, the average density calculating circuit receives a portion of the image data including the specified pixel and at least one of the plurality of pixels surrounding the specified pixel, and calculates the number of exposed pixels included in the portion of the image data as an average density of the image data.

In another embodiment of the invention, the portion of the image data is a region having pixels of P rows and Q columns including the specified pixel.

In another embodiment of the invention, the second sub-pixel data generating circuit includes circuit for generating a probability signal having a first value or a second value depending on a predetermined probability, for the specified pixel, and circuit for generating second sub-pixel data for determining the number and position of sub-pixels to be exposed of the N sub-pixels, based on the condition of the specified pixel, the average density of the image data, and the probability signal.

In another embodiment of the invention, the image processing apparatus further includes a circuit for switching a first mode for outputting the sub-pixel data from the selecting circuit in serial and a second mode for outputting the sub-pixel data from the selecting circuit sequentially by each separate line.

In another aspect of the present invention, an image processing apparatus for smoothing edges in a reproduced image includes: an image data generating circuit for generating image data including a specified pixel and a plurality of pixels surrounding the specified pixel; a first sub-pixel data generating circuit for dividing the specified pixel included in the image data into N sub-pixels, for generating first sub-pixel data for exposing M sub-pixels of the N sub-pixels, M being smaller than N, when the specified pixel is a exposed pixel, and for generating first sub-pixel data for non-exposing all of N sub-pixels when the specified pixel is a non-exposed pixel; an average density calculating circuit for calculating an average density of the image data; a second sub-pixel data generating circuit for dividing the specified pixel included in the image data into N sub-pixels, and for generating second sub-pixel data for determining the number and position of sub-pixels to be exposed of the N sub-pixels, based on the condition of the specified pixel and the average density of the image data calculated by the average density calculating circuit; a judging circuit for judging whether the image data includes at least one of dense regions of exposed pixels and dense regions of non-exposed pixels or not; a selecting circuit, receiving the first sub-pixel data and the second sub-pixel data, for selecting the first sub-pixel data when the judging circuit judges that the image data includes at least one of dense regions of exposed pixels and dense regions of non-exposed pixels, and for selecting the second sub-pixel data when the judging circuit judges that the image data includes none of dense regions of exposed pixels and dense regions of non-exposed pixels; and a supplying circuit for supplying one of the first sub-pixel data and the second sub-pixel data selected by the selecting circuit to exposure circuit which makes exposure.

In one embodiment of the invention, the average density calculating circuit receives a portion of the image data including the specified pixel and at least one of the plurality of pixels surrounding the specified pixel, and calculates the number of exposed pixels included in the portion of the image data as an average density of the image data.

In another embodiment of the invention, the portion of the image data is a region having pixels of P rows and Q columns including the specified pixel.

In another embodiment of the invention, the second sub-pixel data generating circuit includes a circuit for generating a probability signal having a first value or a second value depending on a predetermined probability, for the specified pixel, and a circuit for generating second sub-pixel data for determining the number and position of sub-pixels to be exposed of the N sub-pixels, based on the condition of the specified pixel, the average density of the image data, and the probability signal.

In another embodiment of the invention, the image processing apparatus further includes circuit for switching a first mode for outputting the sub-pixel data from the selecting circuit in serial and a second mode for outputting the sub-pixel data from the selecting circuit sequentially by each separate line.

Thus, the invention described herein makes possible the advantages of (1) providing an image processing method and an image processing apparatus by which isolated dots and thin lines of 1-dot width can accurately be reproduced, and the fattening or the smothering out of the reproduced font images can be avoided, and (2) providing an image processing method and an image processing apparatus by which a tone reproduction characteristic can be improved without causing a pseudo-contour and a moire even in the case where the input image data is a digital halftone image, and moreover, by which both the edge smoothing process and the process for improving the tone reproduction characteristics for a digital halftone image can be applied even in the case where the font images and digital halftone images co-exist in the input image data.

These and other advantages of the present invention will become apparent to those skilled in the art upon reading and understanding the following detailed description with reference to the accompanying figures.

BRIEF DESCRIPTION OF THE DRAWINGS

FIG. 43, is a graph illustrating the relationship between a black dot density of the digital halftone image and an average optical density of the reproduced image.

DESCRIPTION OF THE PREFERRED EMBODIMENTS

Figure 1:
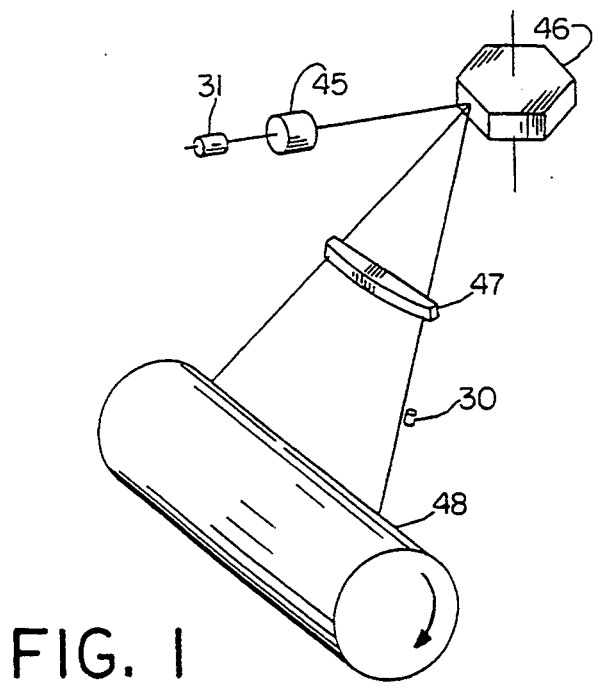
FIG. 1 is a schematic view showing the construction of a printing section of a laser beam printer.

FIG. 1 shows a construction of a printing section of a laser printer which reproduces an image based on an image signal generated by an image processing apparatus of the first example according to the invention. The modulated laser beam from a semiconductor laser 31 is collimated by a collimator lens 45. The collimated laser beam is reflected by a polygon mirror 46 which rotates, and $f\theta$-corrected by an $f\theta$ lens 47, so as to scan the surface of a photoconductive drum 48. The photoconductive drum 48 rotates in a direction indicated by an arrow in FIG. 1. A latent image is formed on the photoconductive drum 48. Based on the latent image on the photoconductive drum 48, an image is formed on a printing sheet by a known electro-photographic technique. A pin photodiode 30 is provided in the vicinity of a 1-line scanning start position of the laser beam. The pin photodiode 30 detects the line scanning timing of the laser beam.

Figure 2A:
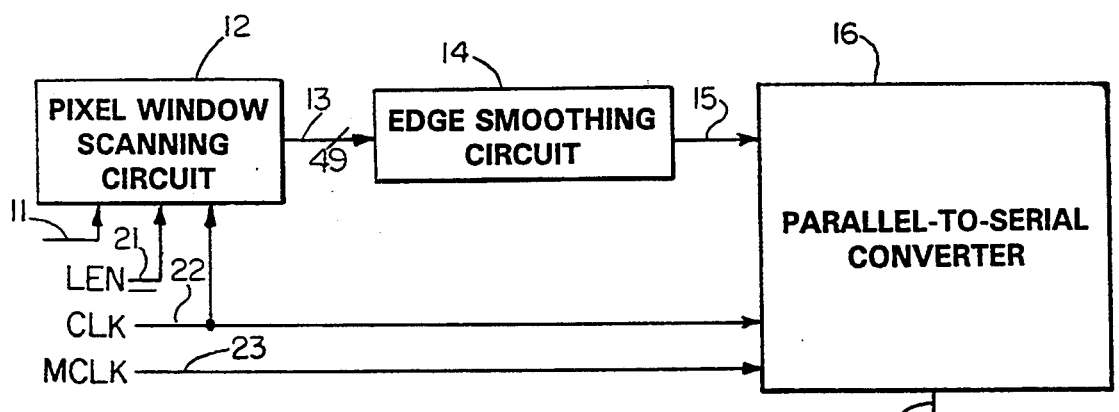
FIGS. 2A to 2C is a schematic block diagram showing an image processing apparatus in a first example according to the invention.

FIG. 2A shows a configuration of an image processing apparatus of the first example according to the invention.

The image processing apparatus includes a pixel window scanning circuit 12, an edge smoothing circuit 14 and a parallel-to-serial converter 16, as is shown in FIG. 2A.

The operation of the image processing apparatus will be described below.

Image data 11 obtained by raster scanning is input into the pixel window scanning circuit 12 in a synchronous manner with the rising edge of the pixel clock CLK 22. A line enable signal LEN_ 21 is an active-low signal indicative of an effective period of the image data in one line. The line enable signal LEN_ 21 is input into the pixel window scanning circuit 12. The pixel window scanning circuit 12 generates image data 13 of 7×7 pixels having a pixel to be processed at the center thereof. Hereinafter, the pixel to be processed is referred to as a specified pixel. The pixel window scanning circuit 12 will be described later in detail.

The image data 13 of 7×7 pixels are input into the edge smoothing circuit 14. The edge smoothing circuit 14 converts The input data of the pixel to be processed into data 15 of 8 sub-pixels which are then output in parallel. More specifically, the edge smoothing circuit 14 generates the data 15 of 8 sub-pixels for determining the number and position of sub-pixels to be exposed of the 8 sub-pixels, based on the condition of the specified pixel and the conditions of the pixels surrounding the specified pixel so that the edges in the reproduced image are smoothed, and so that a thin line may not be made thicker or thinner, or an isolated dot may not be deleted or smothered out. When the specified pixel is an exposed pixel which does not require any exposure correction, the edge smoothing circuit 14 generates the data 15 of 8 sub-pixels for exposing central four sub-pixels of the 8 sub-pixels. The edge smoothing circuit 14 will be described later in detail.

A parallel-to-serial converter 16 converts the data 15 of 8 sub-pixels input in parallel into a serial data row, and outputs a laser modulation signal 17 in a synchronous manner with a clock MCLK 23 having a duration which is ⅛ of that of the pixel clock CLK 22. The parallel-to-serial converter 16 will be described below in detail. The laser modulation signal 17 is applied to a semiconductor laser driving circuit provided in the laser printer which is not shown.

With the above configuration shown in FIG. 2A, the edges in the reproduced image can be smoothed, a thin line will not be made thicker or thinner, and an isolated dot will not be deleted or smothered out.

Figure 2B:
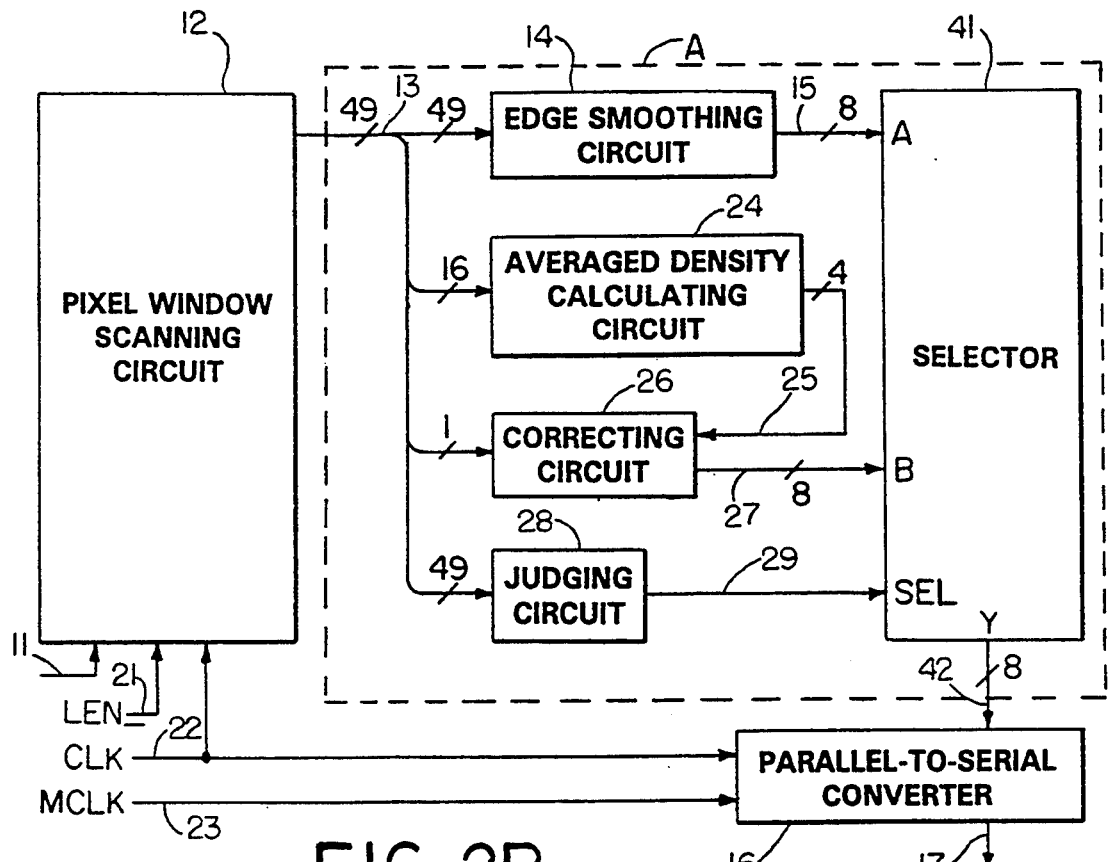

FIG. 2B shows another configuration of an image processing apparatus of the first example according to the invention.

The configuration of the image processing apparatus shown in FIG. 2B is obtained by adding an averaged density calculating circuit 24, a correcting circuit 26, a judging circuit 28 and a selector 41 to the configuration of image processing apparatus shown in FIG. 2A.

The operation of the image processing apparatus will be described below.

The pixel window scanning circuit 12 generates image data 13 of 7×7 pixels having a specified pixel at the center thereof.

The edge smoothing circuit 14 receives the image data 13, and generates the data 15 of 8 sub-pixels for determining the number and position of sub-pixels to be exposed of the 8 sub-pixels, based on the condition of the specified pixel and the conditions of the pixels surrounding the specified pixel. The generated data 15 of 8 sub-pixels is supplied to the selector 41.

Figure 37:
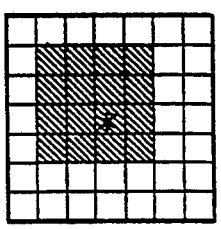
FIG. 37 shows pixels input into an averaged density calculating circuit 24.

Data of 16 pixels including the specified pixel among the data of 49 pixels output from the pixel window scanning circuit 12 are input into the averaged density calculating circuit 24. For example, hatched 16 pixels shown in FIG. 37 are input into the averaged density calculating circuit 24, where the symbol * indicates the specified pixel. The averaged density calculating circuit 24 calculates the number of black pixels included in the 16 input pixels. That is, the number of black pixels may be from 0 to 16. However, 16 is rounded to 15. The purpose of this rounding is to represent the number of black pixels by 4 bits. The averaged density calculating circuit 24 outputs an averaged density signal 25 of 4 bits representing a value of 0 to 15 to the correcting circuit 26.

To the correcting circuit 26, the averaged density signal 25 and only the data of the specified pixel among the data of 49 pixels output from the pixel window scanning circuit 12 are input. The correcting circuit Z6 divides the data of the specified pixel into data of 8 sub-pixels, and outputs data 27 of 8 sub-pixels as correcting signals in parallel. Specifically, the correcting circuit 26 generates data 27 of 8 sub-pixels for determining the number and position of sub-pixels to be black sub-pixels out of the 8 bus-pixels, based on the value of the averaged density signal 25 and the data of the specified pixel. The generated data 27 of 8 sub-pixels is supplies to the selector 41. The correcting circuit 26 will be described later in detail.

To the judging circuit 28, the data of 49 pixels output from the pixel window scanning circuit 12 are input. The judging circuit 28 judges whether there exists a dense region of white or black pixels in any 7×7 pixel window or not. If there is at least one dense region, the judging circuit 28 outputs a judging signal 29 at a high level. If there is no dense region, the judging circuit 28 outputs a judging signal 29 at a low level. The judging signal 29 is supplied to the selector 41. The judging circuit 28 will be described later in detail.

The selector 41 selects one of the data 15 of 8 sub-pixels output from the edge smoothing circuit 14 and the data 27 of 8 sub-pixels output from the correcting circuit 26, based on the judging signal 29. Specifically, if the judging signal 29 is at the high level, the selector 41 selects the data 15 of 8 sub-pixels output from the edge smoothing circuit 14. If the judging signal 29 is at a low level, the selector 41 selects the data 27 of 8 sub-pixels output from the correcting circuit 26. The selected one of the data is output as sub-pixel data 42.

The parallel-to-serial converter 16 converts the data 42 of 8 sub-pixels input in parallel into a serial data row, and outputs a laser modulation signal 17 in a synchronous manner with a clock MCLK 23 having a duration which is $\frac{1}{8}$ of that of the pixel clock CLK 22. The parallel-to-serial converter 16 will be described below in detail. The laser modulation signal 17 is applied to a semiconductor laser driving circuit provided in the laser printer which is not shown.

With the above configuration shown in FIG. 2B, the judging circuit 28 judges whether the pixel to be processed is included in the digital halftone image region, or in the region of binary images such as font images. Based on the judged result, either one of the edge smoothing process or the correcting process for digital halftone is selected to be effective. As a result, even when the font images and digital halftone images co-exist in the input image data, both the edge smoothing process for font images and the process for improving the tone reproduction characteristic in digital halftone image can be applied.

Figure 2C:
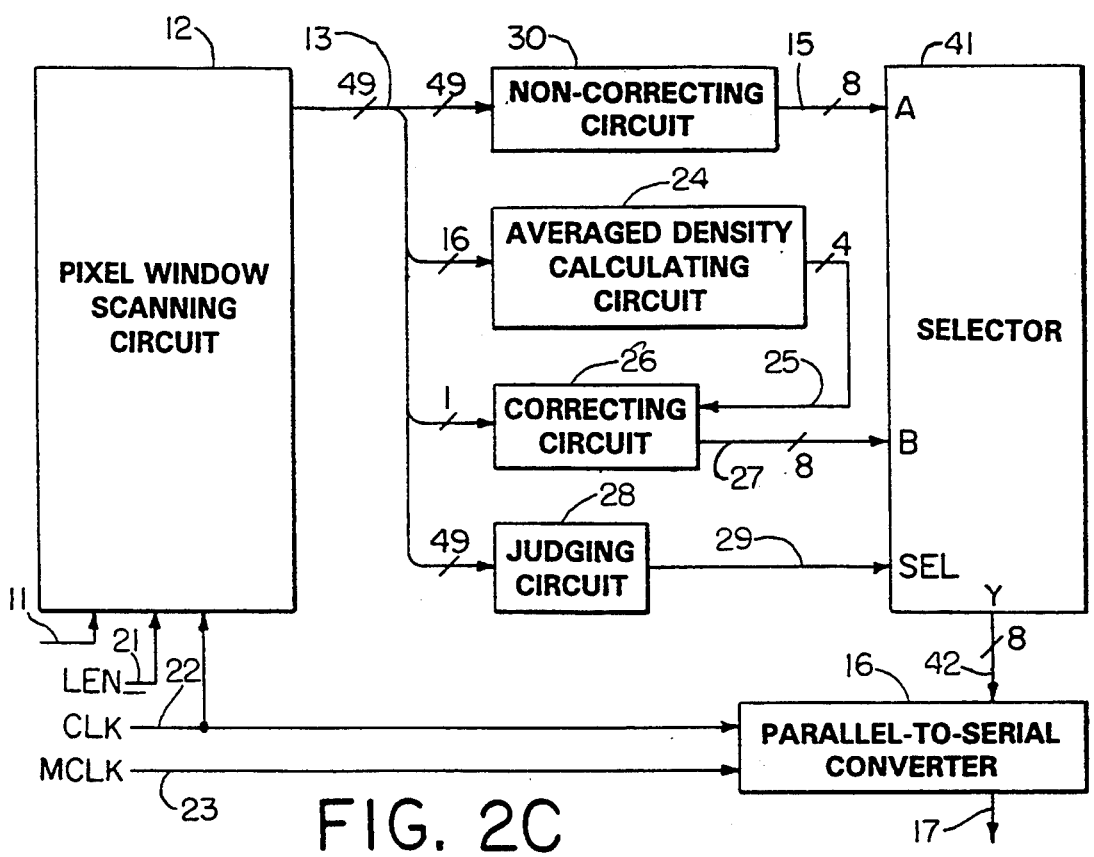

FIG. 2C shows another configuration of an image processing apparatus of the first example according to the invention.

The configuration of the image processing apparatus shown in FIG. 2C is obtained by replacing the edge smoothing circuit 14 in the image processing apparatus shown in FIG. 2B with a non-correcting circuit 30.

The non-correcting circuit 30 receives the image data 13 of 7×7 pixels having a specified pixel at the center thereof, and generates data 15 of 8 sub-pixels. Specifically, the non-correcting circuit 30 generates sub-pixel data 15 for exposing the central four sub-pixels of the 8 sub-pixels, when the specified pixel is an exposed pixel, and generates sub-pixel data 15 for non-exposing all of the 8 sub-pixels, when the specified pixel is a non-exposed pixel.

The remaining circuits, i.e. the pixel window scanning circuit 12, the averaged density calculating circuit 24, correcting circuit 26, judging circuit 28, selector 41 and parallel-to-serial converter 16 shown in FIG. 2C are the same circuits as is shown in FIG. 2B. Therefore, the description of the function and operation of the remaining circuits are omitted.

With the above configuration shown in FIG. 2C, the judging circuit 28 judges whether the pixel to be processed is included in the digital halftone image region, or in the region of binary images such as font images. Based on the judged result, either the non-correcting process or the correcting process for digital halftone is selected to be effective.

Figure 3:
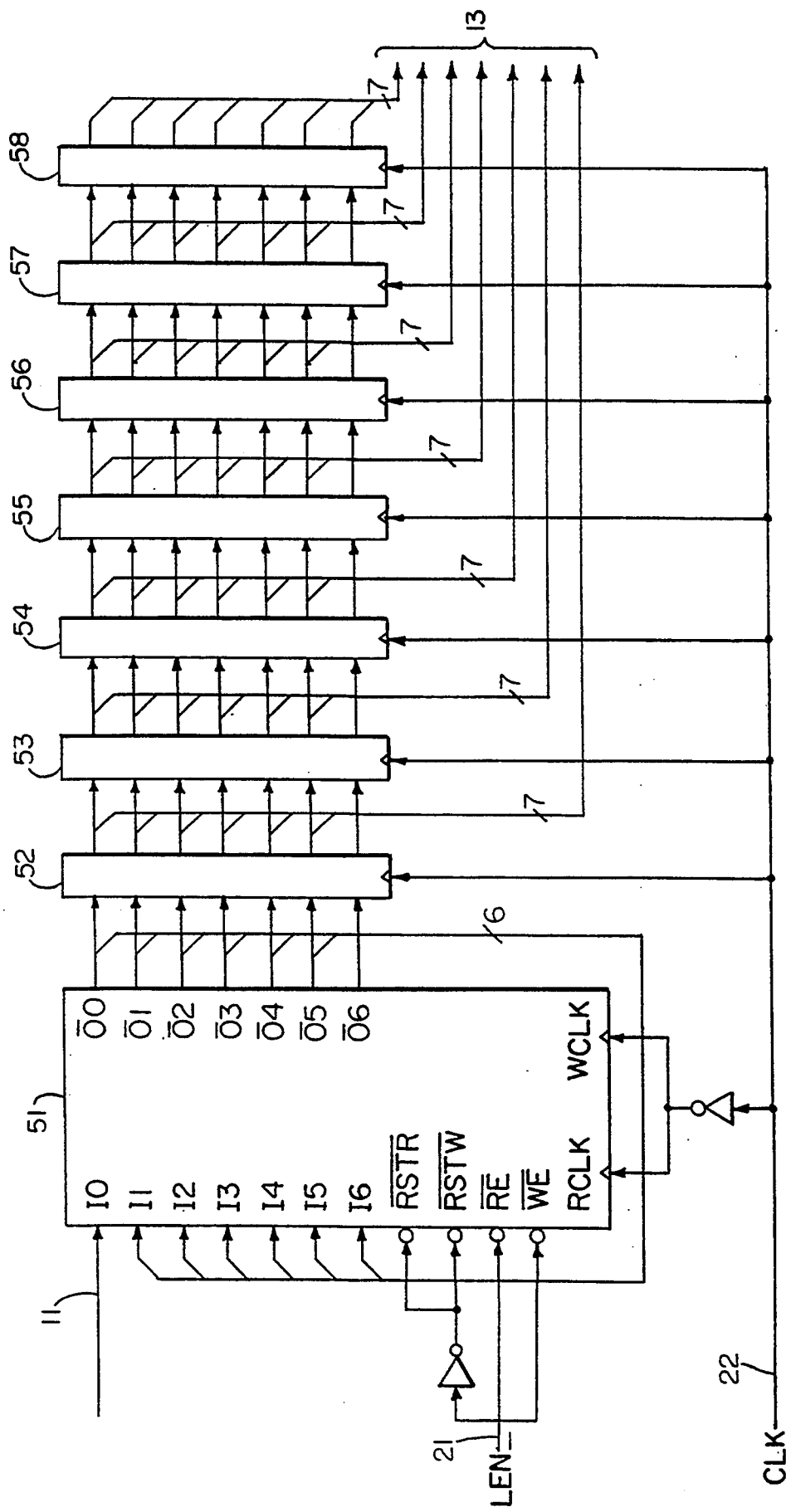
FIG. 3 is a block diagram of a pixel window scanning circuit 12 in FIGS. 2A to 2C.

FIG. 3 shows a configuration of the pixel window scanning circuit 12. The pixel window scanning circuit 12 includes a line buffer memory 51 for inputting/outputting data of 7-bit width and latches 52 to 58 each having 7-bit width.

The operation of the pixel window scanning circuit 12 will be described with reference to FIG. 3. An inverted signal of the line enable signal LEN_ 21 is input into the read reset terminal $\overline{RSTR}$ and the write reset terminal $\overline{RSTW}$ of the line buffer memory 51. An inverted signal of the pixel clock CLK 22 is input into the read clock terminal RCLK and the write clock terminal WCLK of the line buffer memory 51. The line enable signal LEN_ 21 is directly input into the read enable terminal $\overline{RE}$ and the write enable terminal $\overline{WE}$ of the line buffer memory 51.

The line buffer memory 51 receives the image data 11 at the data input terminal $I_0$, and outputs an image signal which is delayed by 1 line at the data output terminal $\overline{O}_0$. The image signal which is delayed by 1 line output from the data output terminal $\overline{O}_0$ is input to the data input terminal $I_1$. Then, the line buffer memory 51 outputs an image signal which is delayed by 2 lines from the image data 11 at the output terminal $\overline{O}_1$. Similarly, the line buffer memory 51 outputs image signals which are delayed by 3 lines, 4 lines, 5 lines, 6 lines and 7 lines from the image data 11 at the output terminals $\overline{O}_2$, $\overline{O}_3$, $\overline{O}_4$, $\overline{O}_5$, and $\overline{O}_6$, respectively. Each of latches 52-58 latches the line-delayed image signals from the line buffer memory 51 and delays each image signal by 1 pixel. With the above-described configuration, the pixel window scanning circuit 12 outputs the image data 13 of 49 pixels in the 7×7 pixel window.

Figure 4:
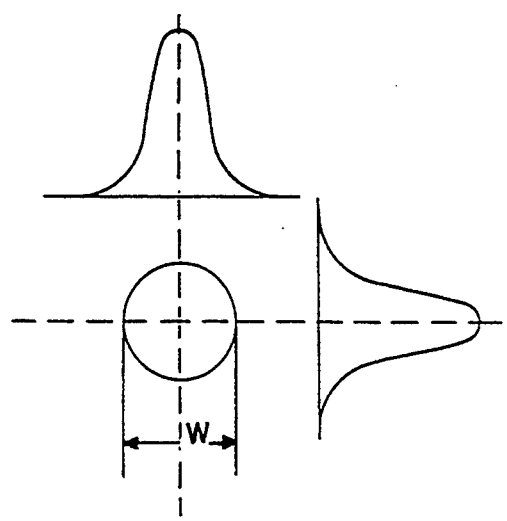
FIG. 4 shows an exposure energy distribution of a laser beam.
Figure 5:
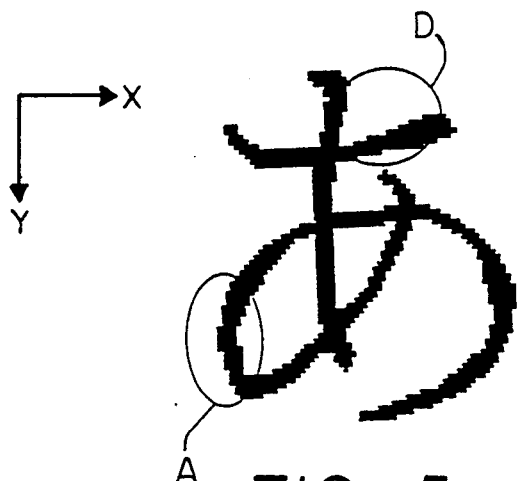
FIG. 5 shows an example of image data 11.
Figure 6:
FIG. 6 shows a printed image of the image data of FIG. 5 by a laser printer without any processes.

Before the edge smoothing circuit 14 is described, the exposure energy distribution in a laser beam spot is described. FIG. 4 shows the exposure energy distribution of laser beam. Usually, the laser beam diameter w is designed to be about 1.3 times as large as the resolution of the image data 11. For example, if the resolution of the image data 11 is 300 dpi, the laser beam diameter is about 110 μm. Assuming that the image data 11 is the data shown in FIG. 5. In FIG. 5, an X-axis indicates a main-scanning direction and a Y-axis indicates a sub-scanning direction. When the semiconductor laser is driven directly based on the image data 11 shown in FIG. 5, an image shown in FIG. 6 is reproduced by the laser printer. As is apparent from FIG. 6, the reproduced image has jagged edges of 300 dpi.

Figure 7:
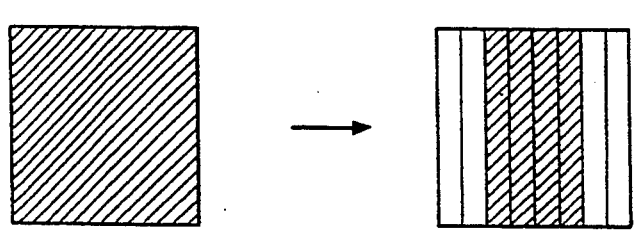
FIG. 7 shows sub-pixel data generated in the case of an exposed pixel which requires no correction.

In order to eliminate the jagged edges due to the resolution of the image data 11, the edge smoothing circuit 14 divides a specified pixel into 8 sub-pixels along the main-scanning direction for the edge smoothing, and generates sub-pixel data 15 corresponding to 8 sub-pixels. The condition of each sub-pixel (exposed or non-exposed) is determined according to the condition of the specified pixel and that of the surrounding pixels (white pixels or black pixels) of the image data to be reproduced. When the specified pixel is an exposed pixel (a black pixel) which does not require any exposure correction, the edge smoothing circuit 14 generates sub-pixel data 15 for exposing the central four sub-pixels of the 8 sub-pixels as is shown in FIG. 7.

Figure 8:
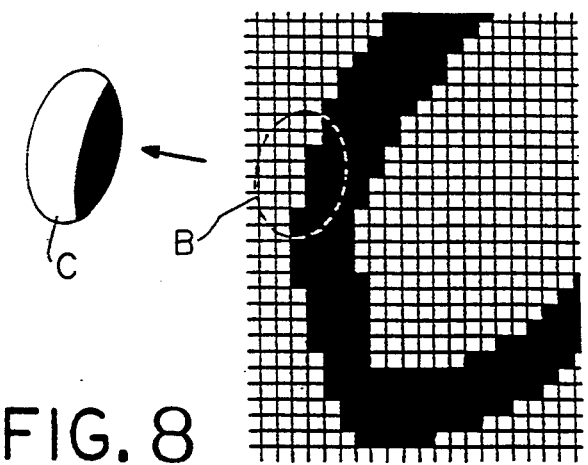
FIG. 8 is an enlarged view of a portion A in the image data of FIG. 5.

(A) Example of an edge smoothing process in the main-scanning direction:

FIG. 8 is an enlarged view of a portion A of the image data 11 shown in FIG. 5. The operation of the edge smoothing circuit 14 will be described by using image data in a portion B of FIG. 8 as an example.

Figure 9:
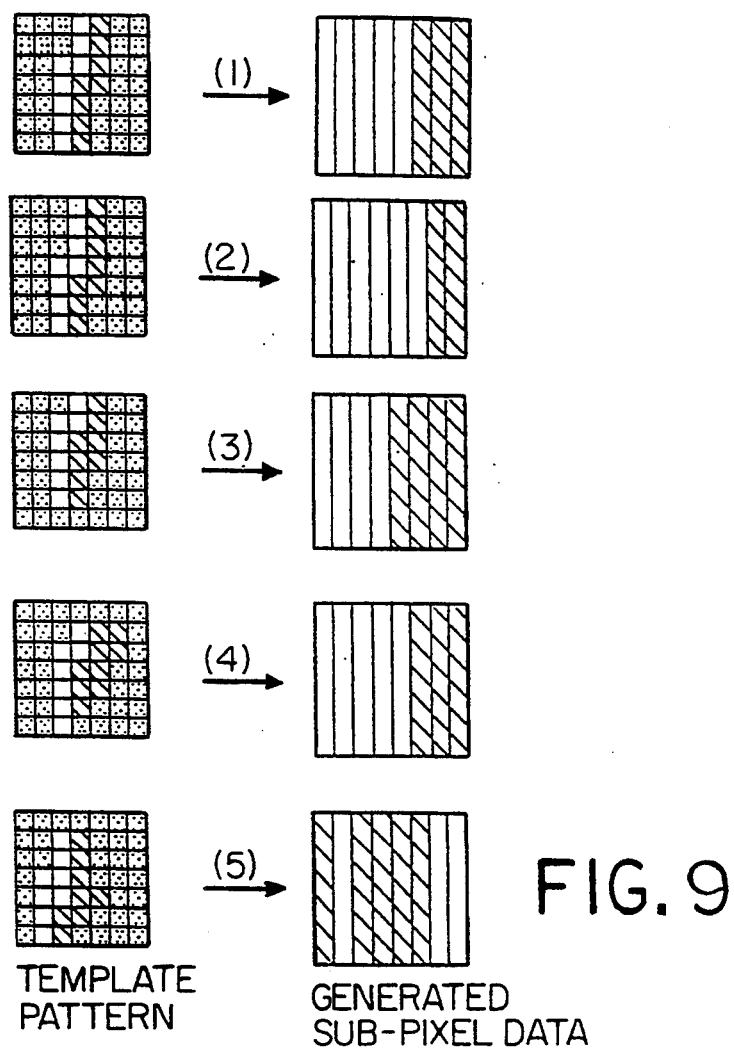
FIG. 9 shows template patterns for pattern matching and the sub-pixels to be generated.

FIG. 9 shows template patterns for performing the pattern matching with pixels in the pixel window having a pixel to be processed at the center, and sub-pixel data generated by the edge smoothing circuit 14 when the pixels match the respective template patterns. In the template patterns shown in FIG. 9, a hatched pixel indicates an exposed pixel, a white pixel indicates a non-exposed pixel, and a dot meshing pixel indicates a pixel which is not cared for in the matching. In the sub-pixel data shown in FIG. 9, a hatched sub-pixel indicates an exposed sub-pixel. With considering that the spot of the laser beam is a circle having a diameter about 1.3 times as large as the one pixel size, jagged edges in the reproduced image are reduced by controlling the number and position of sub-pixels to be exposed, as is shown in a portion C of FIG. 8. Thus, the edges in the reproduced image are smoothed.

The edge smoothing process in the main-scanning direction according to the present invention is characterized by the generation of sub-pixel data in the case (5) in FIG. 9. Specifically, in the case (5), the sub-pixel data for exposing the five sub-pixels in generated. As mentioned above, when the specified pixel does not require any exposure correction, the sub-pixel data for exposing the central four sub-pixels is generated. Accordingly, the exposure time per one pixel in the case of FIG. 9 is longer than that for the exposed pixel which does not require any exposure correction. Thus, the sub-pixel data for exposing a half of sub-pixels is generated when the pixel does not require any exposure correction. This makes it possible to widen the range of the exposure correction.

Figure 10:
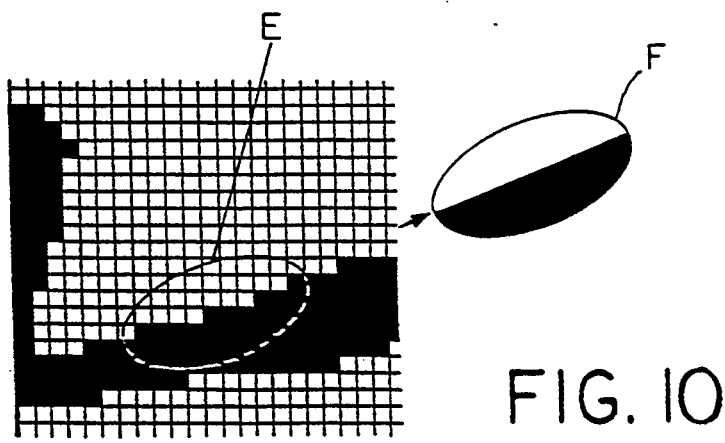
FIG. 10 is an enlarged view of a portion D in the image data of FIG. 5.

(B) Example of an edge smoothing process in the sub-scanning direction:

FIG. 10 is an enlarged view of a portion D of the image data 11 shown in FIG. 5. The operation of the edge smoothing circuit 14 will be described by using image data in a portion E of FIG. 10 as an example.

Figure 12:
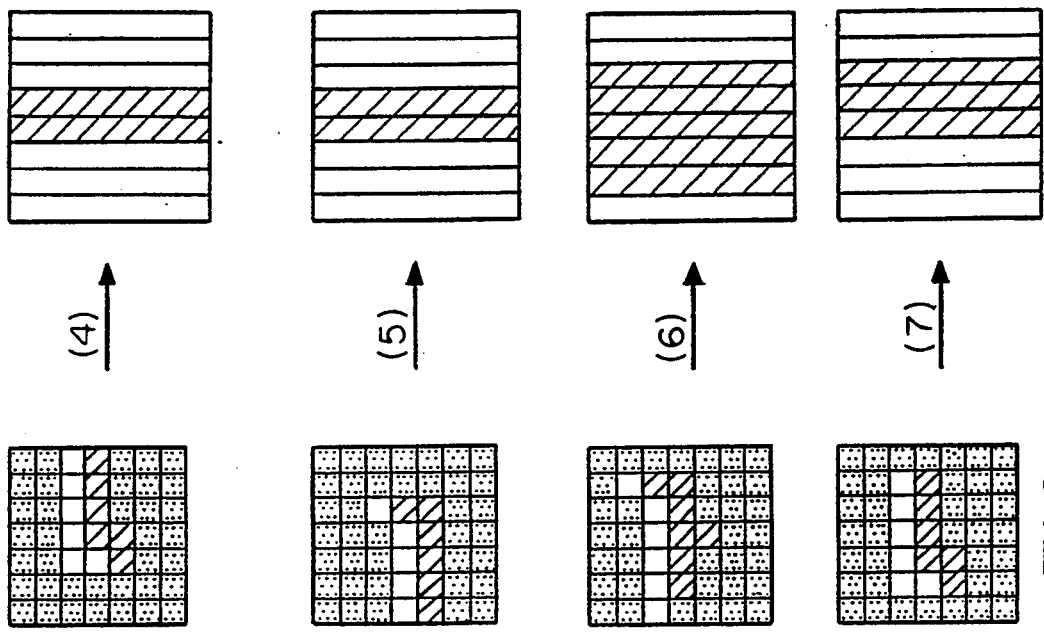
FIG. 12 shows template patterns for pattern matching and sub-pixels to be generated.
Figure 11:
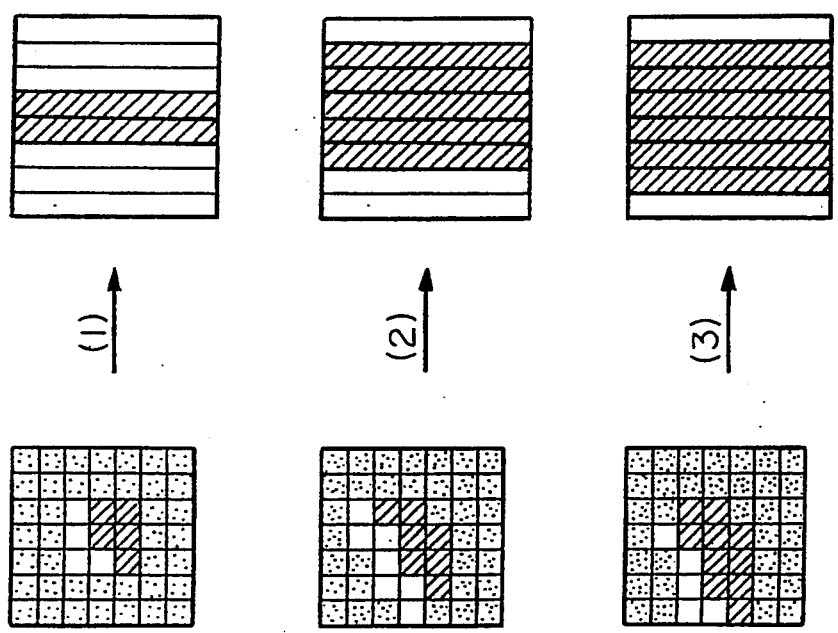
FIG. 11 shows template patterns for pattern matching and sub-pixels to be generated.

FIGS. 11 and 12 show template patterns for performing the pattern matching with pixels in the pixel window having a pixel to be processed at the center, and sub-pixel data generated by the edge smoothing circuit 14 when the pixels match the respective template patterns. The reproduced image obtained by performing the exposure based on the generated sub-pixel data is as shown by a portion F in FIG. 10. That is, the edges are smoothed.

Figure 41A:
FIG. 41A shows image data.
Figure 41B:
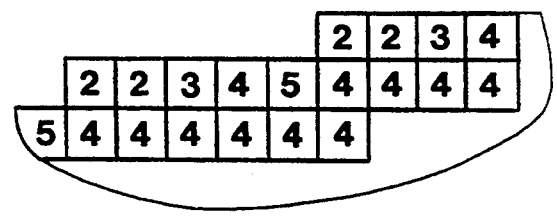
FIG. 41B shows the numbers of exposed sub-pixels for respective pixels, and 41C shows the magnitude of the exposure energy for each pixel represented by a size of a solid circle.
Figure 41C:
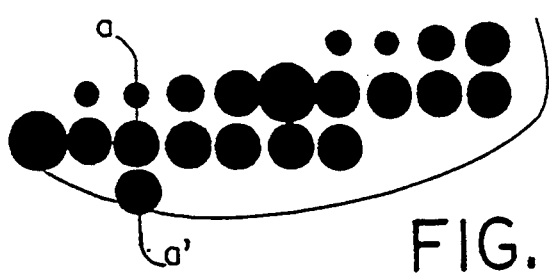

In the case where the image data shown in FIG. 41A is converted into sub-pixel data by using the template patterns in FIG. 12, the numbers of exposed sub-pixels for respective pixels are determined as shown in FIG. 41B. In FIG. 41C, the magnitude of the exposure energy for each pixel is represented by the size of a solid circle.

Figure 42:
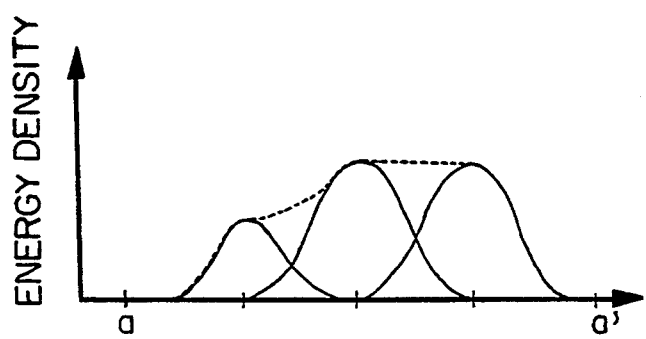

The exposure energy distribution along a line a–a' in FIG. 41C is shown in FIG. 42. In FIG. 42, a solid line indicates the exposure energy density of each pixel, and a dotted line indicates the synthesized exposure energy density. FIGS. 41A to 41C and 42 clearly shows how the edge smoothing effects are attained.

The edge smoothing process in the sub-scanning direction according to the present invention is characterized by the generation of sub-pixel data in the cases (2) and (3) in FIG. 11 and (6) in FIG. 12. Specifically, in these cases, the exposure time per one pixel is longer than that for the exposed pixel which does not require any exposure correction. As described above, when the specified pixel does not require any exposure correction, the sub-pixel data for exposing the central four sub-pixels is generated. As a result, when the specified pixel requires an exposure correction, the exposure energy per one pixel can be increased or decreased as compared with the exposure energy for the pixel which does not require any exposure correction. This makes it possible to widen the range of the exposure correction.

Figure 13:
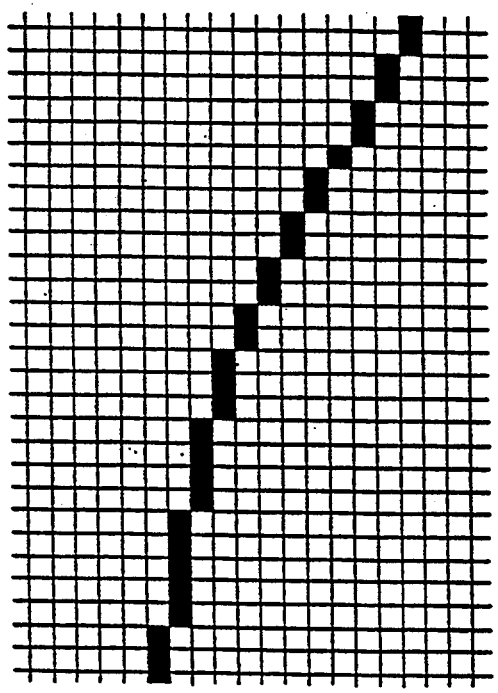
FIG. 13 shows image data of a thin line having a 1-pixel width in the sub-scanning direction.

(C) Example of an edge smoothing process for a thin line in a sub-scanning direction:

FIG. 13 shows image data of a thin line having 1-pixel width along the sub-scanning direction. The operation of the edge smoothing circuit 14 will be described using the image data of FIG. 13 as an example.

Figure 14:
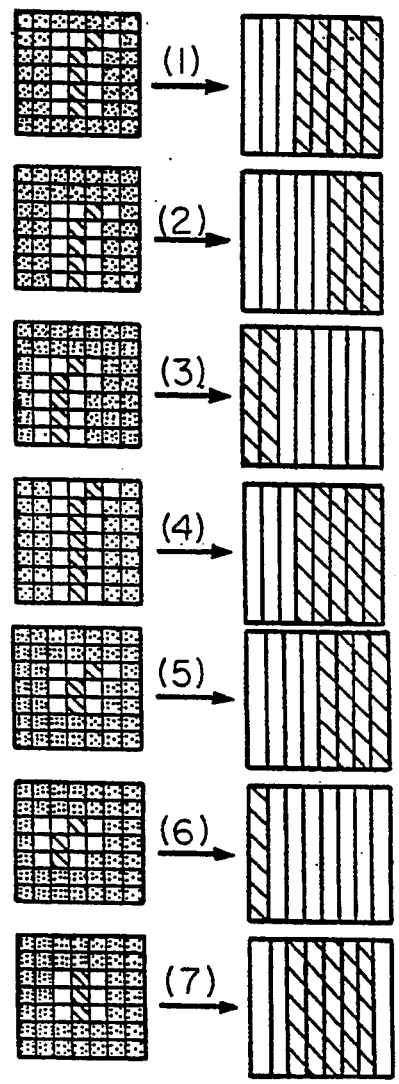
FIG. 14 shows template patterns for pattern matching and the sub-pixels to be generated.

FIG. 14 shows template patterns for performing the pattern matching with pixels in the pixel window having a pixel to be processed at the center, and sub-pixel data generated by the edge smoothing circuit 14 when the pixels match the respective template patterns. Though not shown in FIG. 14, other template patterns obtained by reversing the template patterns in FIG. 14 vertically and horizontally, and corresponding sub-pixel data obtained by horizontally reversing the sub-pixel data are also used for the pattern matching.

If the pixels match both the template patterns (2) and (5), a priority is given to the matching with the template pattern (2). If the pixels match both the template patterns (3) and (6), a priority is given to the matching with the template pattern (3). The lowest priority is given to the template pattern (7).

By performing the exposure based on the sub-pixel data thus generated, the edges in the reproduced image are smoothed, and the thin line can accurately produced without causing the thin line to be a faint line or a discontinuous line. As described above, when the specified pixel does not require any exposure correction, the sub-pixel data for exposing the central four sub-pixels is generated. On the other hand, when the specified pixel is included in a thin line, the number of sub-pixels to be exposed is controlled so that the exposure time per one pixel is increased by 25% as compared with that for the pixel with no exposure correction. In,addition, the position of sub-pixels to be exposed is shifted so as to eliminate jaggies in the reproduced image. For example, as the result of the profess of the matching patterns (2) and (3), the exposure position is shifted to the right by four sub-pixels (corresponding to a half of one pixel), and five sub-pixels are successively exposed.

According to the conventional edge smoothing process, the exposure energy per one pixel cannot be increased as compared with that for an exposed pixel which does not require any exposure correction. Thus, the exposure energy should be larger than necessary in order to avoid a thin line to be faint. As a result, the resulting font images are smothered out or fattened.

Figure 15:
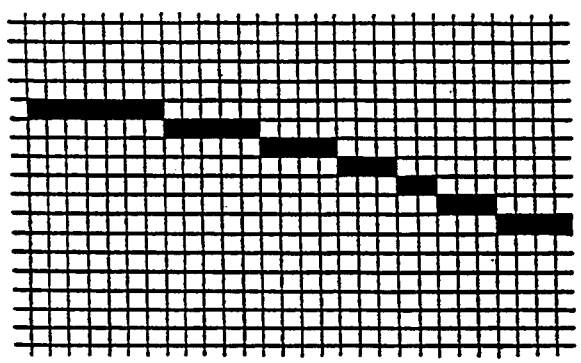
FIG. 15 shows image data of a thin line having a 1-pixel width in the main-scanning direction.

(D) Example of an edge smoothing process for a thin line in a main-scanning direction:

FIG. 15 shows image data of a thin line having 1-pixel width along the main-scanning direction. The operation of the edge smoothing circuit 14 will be described using the image data of FIG. 15 as an example.

Figure 16:
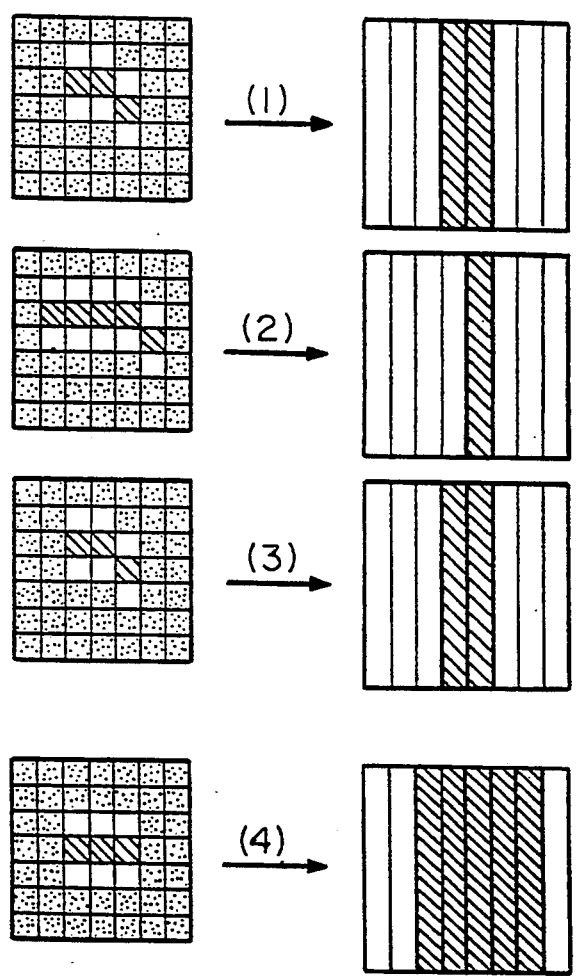
FIG. 16 shows template patterns for pattern matching and the sub-pixels to be generated.

FIG. 16 shows template patterns for performing the pattern matching with pixels in the pixel window having a pixel to be processed at the center, and sub-pixel data generated by the edge smoothing circuit 14 when the pixels match the respective template patterns. Though not shown in FIG. 16, other template patterns obtained by reversing the template patterns in FIG. 16 vertically and horizontally, and corresponding sub-pixel data obtained by horizontally reversing the sub-pixel data are also used for the pattern matching.

By performing the exposure based on the sub-pixel data thus generated, the edges in the reproduced image are smoothed, and the thin line can be accurately produced without causing the thin line to be faint or discontinuous. In order to eliminate a faint or discontinuous thin line, and to reduce the jagged edges, the number of exposed sub-pixels is increased. For example, as the result of the process of the matching pattern (1), the image data which is originally non-exposed pixel is converted to sub-pixel data for exposing two sub-pixels, so that the jaggies are reduced. According to the generation of sub-pixel data in the case (4) in FIG. 16, the exposure energy per one pixel is increased by 25% as compared with that for the exposed pixel which does not require any exposure correction. As a result, the thin line can be prevented from being faint.

Figure 17:
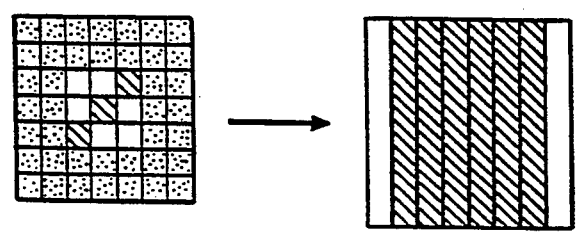
FIG. 17 shows template patterns for pattern matching and the sub-pixels to be generated.
Figure 17:
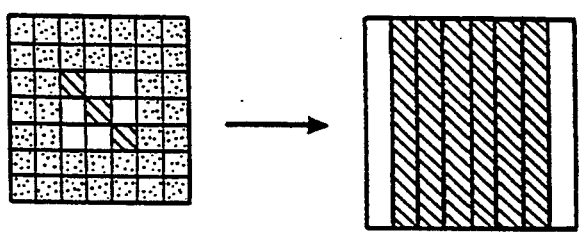

(E) Process for a thin line in an oblique direction:

FIG. 17 shows template patterns for performing the pattern matching with pixels in the pixel window having a pixel to be processed at the center, and sub-pixel data generated by the edge smoothing circuit 14 when the pixels match the respective template patterns.

By performing the exposure based on the sub-pixel data thus generated, data of a pixel included in the thin line having 1-pixel width in an oblique direction is converted into data of six successive sub-pixels while data of the exposed pixel which does not require any exposure correction is converted into data of central four sub-pixels. Accordingly, exposure energy per one pixel is increased by 50% as compared with that for the exposed pixel which does not require any exposure correction. As compared with an exposed pixel included in the thin line in the main-scanning direction or in the sub-scanning direction, the pixel included in the thin line in the oblique direction has a longer distance from an adjacent exposed pixel. For this reason, if the exposure energy is not increased so much, the reproduced thin line may be faint.

Figure 18:
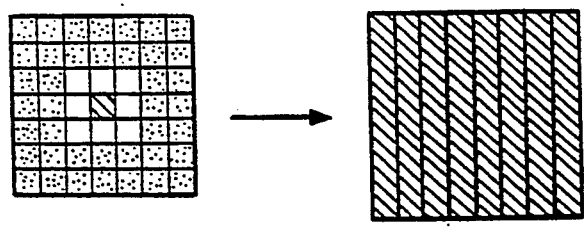
FIG. 18 shows a template pattern for pattern matching and the sub-pixels to be generated.

(F) Process for an isolated dot:

FIG. 18 shows template patterns for performing the pattern matching with pixels in the pixel window having a pixel to be processed at the center, and sub-pixel data generated by the edge smoothing circuit 14 when the pixels match the respective template patterns.

While data of an exposed pixel which does not require any exposure correction is converted into data of the central four sub-pixels, an isolated exposed pixel is converted into data of eight successive sub-pixels. Accordingly, the exposure energy per one pixel is increased by 100% as compared with that for the exposed pixel which does not require any exposure correction. The isolated exposed pixel has no adjacent exposed pixels. For this reason, if the exposure energy is not increase sufficiently, the isolated dot cannot be reproduced.

Figure 19:
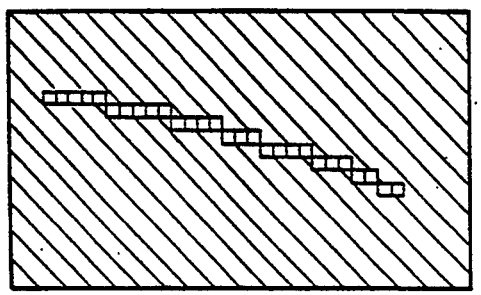
FIG. 19 shows an example of reversed image data of a thin line having a 1-pixel width.

(G) Process for a reversed thin line and a reversed isolated dot:

FIG. 19 shows an example of image data of a reversed thin line of 1-pixel width. As is shown in FIG. 19, most of the surrounding pixels are exposed pixels, and the thin line is constituted of non-exposed pixels. Such a thin line is called a reversed thin line. Similarly, all of the surrounding pixels are exposed pixels, and an isolated dot is constituted of an isolated non-exposed pixel. Such an isolated dot is referred to as a reversed isolated dot.

Figure 20:
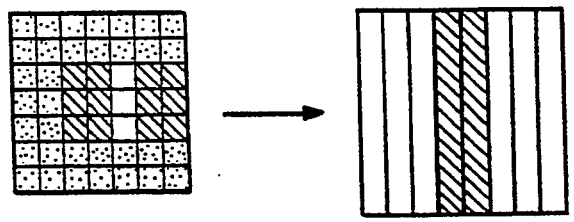
FIG. 20 shows a template pattern for pattern matching and the sub-pixels to be generated.

In the case of the reversed thin line or isolated dot, the reproduced image may be smothered out so as to be black due to a leakage of exposure energy for the surrounding exposed pixels to the position of the non-exposed pixel. FIG. 20 shows template patterns for performing the pattern matching with pixels in the pixel window having a pixel to be processed at the center, and sub-pixel data generated by the edge smoothing circuit 14 when the pixels match the respective template patterns. In order to prevent the reproduced pixel to be smothered out, the pixels around the reversed thin line and the pixels adjacent to the reversed isolated dot are detected by matching with the template patterns, so that sub-pixel data for exposing two sub-pixels are generated as is shown in FIG. 20. As a result, the exposure energy per one pixel for exposed pixels adjacent to the reversed thin line or the reversed isolated dot is decreased by 50%. Thus, the reversed thin line and the reversed isolated dot can be reproduced without being smothered out.

Actually, the matching with the input image data is performed by using many template patterns other than those shown in the figures, so that data of eight sub-pixels are generated for each pixel. The matching process for the template pattern and the input image data and the generation of data of eight sub-pixels can be represented by a truth table having 49 inputs end 8 outputs. The inputs of the truth table may include inputs which are not cared in the matching process. By using a logic synthetic software, the process in the edge smoothing circuit 14 based on the truth table can be implemented by the combination of AND gates and OR gates after logic compression.

Figure 38:
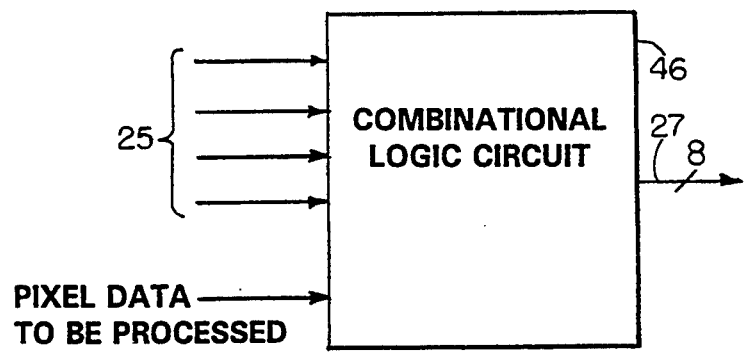
FIG. 38 is a block diagram showing a correcting circuit 26 in the first example.
Figure 35:
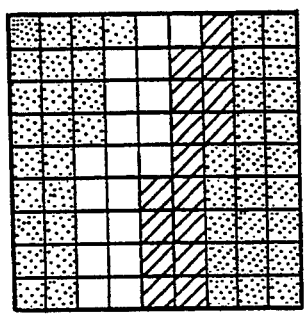
FIG. 35 shows an exemplary template pattern.

Next, the operation of the correcting circuit 26 in FIGS. 2B and 2C is described below. The correcting circuit 26 receives data of the pixel to be processed and the averaged density signal 25, and generates sub-pixel data based on the data of the pixel to be processed and the averaged density signal 25. More specifically, when the pixel to be processed is a white pixel (a non-exposed pixel), the correcting circuit 26 generates sub-pixel data for non-exposing all of eight sub-pixels. When the pixel to be processed is a black pixel (an exposed pixel), the correcting circuit 26 generates sub-pixel data for exposing a predetermined number of sub-pixels according to the value of the averaged density signal 25. The relationship between the value of the averaged density signal 25 and the sub-pixel data output from the correcting circuit 26 is shown in Table 1. In Table 1, hatched sub-pixels indicate black sub-pixels. The averaged density signal 25 is a 4-bit signal, so that Table 1 represents a truth table having 5 inputs and 8 outputs. FIG. 38 shows a configuration of the correcting circuit 26. The correcting circuit 26 includes a combinational logic circuit 46 having 5 inputs and 8 outputs. By using a method of logic synthesizing based on the truth table, the combinational logic circuit 46 can be designed for the correcting circuit 26 shown in FIG. 38.

TABLE 1

| Pixel to be processed | Value of averaged density signal | Sub-pixel data |
| --- | --- | --- |
| White | — | a |
| Black | 1 | b |
| Black | 2 | c |
| Black | 3 | d |
| Black | 4~5 | e |
| Black | 6–10 | f |
| Black | 11~14 | g |
| Black | 15 | h |

A digital halftone image is an image digitally representing the halftone which is processed by using an error diffusion method or the like. The digital halftone image randomly includes white dots and black dots, and the density thereof is reproduced by the ratio in number of black dots to white dots per unit area.

When a digital halftone image is to be reproduced by an electro-photographic printer, it is difficult to reproduce an isolated black dot. Accordingly, for a low density image having many isolated black dots, the reproduced image inevitably has a lower density. In addition, an isolated white dot is easily smothered out. Accordingly, for a high density image having many isolated white dots, the reproduced image inevitably has a higher density. However, by the above correcting circuit 26, a black pixel in a low density image region is converted into sub-pixels including a larger number of exposed sub-pixels per one pixel than in an intermediate density image region, and a black pixel in a high density image region is converted into sub-pixels including a smaller number of exposed sub-pixels per one pixel than in the intermediate density image region. As a result, the density of the reproduced image can be corrected so as to have a linear relationship to the block dot density in the image data.

Figure 39:
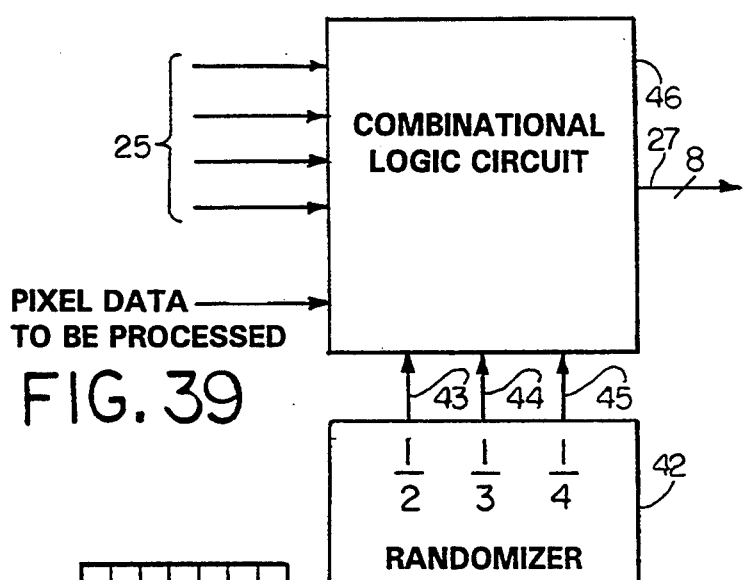
FIG. 39 is a block diagram showing a correcting circuit 26 in the second example.
Figure 36:
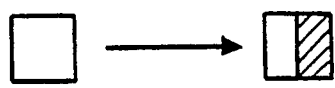
FIG. 36 shows image data to be replaced.

FIG. 39 shows another configuration of correcting circuit 26. The correcting circuit 26 includes a combinational logic circuit 46 having 5 inputs and 8 outputs and a randomizer 42 for generating a random signal with a predetermined probability. The randomizer 42 supplies random signals 43 to 45 to the combinational logic circuit 46. The random signal 43 becomes a high level at an average probability of ½ for each pixel. The random signal 44 becomes a high level at an average probability of ½ for each pixel. The random signal 45 becomes a high level at an average probability of ¼ for each pixel. The input and output relationship of the combinational logic circuit 46 in FIG. 39 is shown in Table 2.

TABLE 2

| Pixel to be processed | Value of averaged density signal | Signal 43 | Signal 44 | Signal 45 | Sub-pixel data |
| --- | --- | --- | --- | --- | --- |
| White | — | — | — | — | a |
| Black | 1 | — | — | — | b |
| Black | 2 | — | — | — | c |
| Black | 3 | — | — | — | d |
| Black | 4 | — | — | 1 | d |
| Black | 4 | — | — | 0 | e |
| Black | 5 | — | — | — | e |
| Black | 6 | — | 1 | — | e |
| Black | 6 | — | 0 | — | f |
| Black | 7 | — | — | 1 | e |
| Black | 7 | — | — | 0 | f |
| Black | 8–9 | — | — | — | f |
| Black | 10 | — | — | 0 | f |
| Black | 10 | — | — | 1 | g |
| Black | 11 | 1 | — | — | f |
| Black | 11 | 0 | — | — | g |
| Black | 12 | — | — | — | g |
| Black | 13 | — | 0 | — | g |
| Black | 13 | — | 1 | — | h |
| Black | 14 | 1 | — | — | g |
| Black | 14 | 0 | — | — | h |
| Black | 15 | — | — | — | h |

In Table 2, sub-pixel data a to h are identical with the sub-pixel data a to h shown in Table 1. As is seen from Table 2, for example, when the pixel to be processed is black and the averaged density signal has a value of 4, the number of black sub-pixels in the sub-pixel data is 6 at the probability of ¼, and 5 at the probability of ¾. As is understood, by providing the transition characteristic to the variation in number of black sub-pixel per one pixel with respect to the value of the averaged density signal, the pseudo-contour can be prevented from appearing on the reproduced image by the printer.

Figure 43:
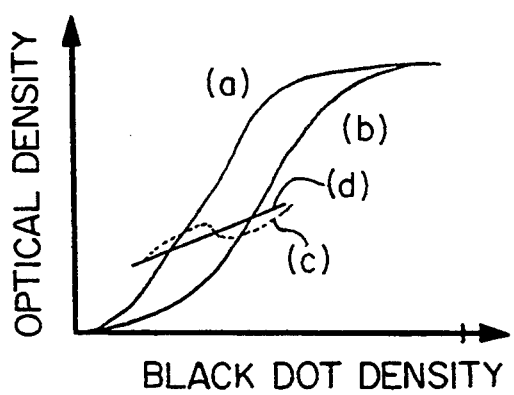
FIG. 43 shows the exposure energy distribution along a line a–a' in FIG. 41C.

Referring to FIG. 43, the transition characteristic is described in detail. FIG. 43 illustrates the relationship between the black dot density of the digital halftone image and an average optical density of the reproduced image. The curve (a) in FIG. 43 indicates the case where data of a black dot is always converted into sub-pixel data d for exposing six sub-pixels shown in Table 1. A curve (b) in FIG. 43 indicates the case where data of a black dot is always converted into sub-pixel data e for exposing five sub-pixels shown in Table 1. If data of a black pixel is converted into sub-pixel data for exposing a predetermined number of sub-pixels based on the averaged density signal, the transition from the curve (a) to the curve (b) in FIG. 43 causes a peak in a density curve, as is shown by the curve (c) in FIG. 43. In order to eliminate such a peak, when the averaged density signal has a prescribed value, the number of exposed sub-pixels is changed based on probability. As a result, the transition characteristic can be linear as shown by a line (d) in FIG. 43.

In Table 2, at the values of 4, 6, 7, 10, 11, 13, and 14 of the averaged density signal 25, the number of black sub-pixels is changed based on the random signal from the randomizer 42, so as to provide the transition characteristic to the converting characteristic into sub-pixels.

Figure 40:
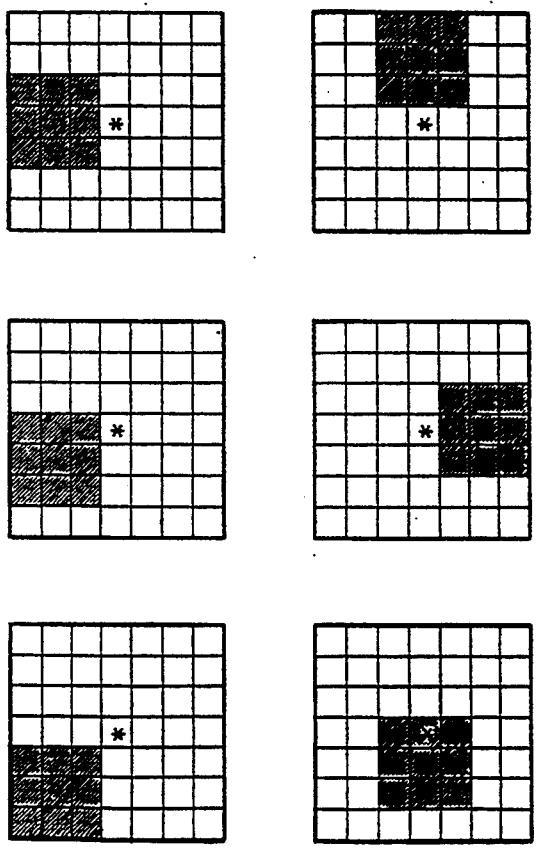
FIG. 40 shows a 3×3 pixel window included in a 7×7 pixel window having a pixel to be processed at the center thereof.

Next, the judging circuit 28 in FIGS. 2B and 2C is described below. To the judging circuit 28, the data 13 of 49 pixels from the pixel window scanning circuit 12 are input. When white and black pixels mixedly exist in every 3×3 pixel window included in the 7×7 pixel window with a pixel to be processed at the center, the judging circuit 28 outputs the judging signal 29 at a high level. Each set of hatched pixels in FIG. 40 shows an exemplary 3×3 pixel window included in the 7×7 pixel window. The total number of 3×3 pixel windows included in the 7×7 pixel window is 25. If there is at least one 3×3 pixel window in which all the pixels are black or white, the judging circuit 28 outputs the judging signal 29 at a low level. That is, the low level of the judging signal 29 means that the judging signal 29 detects a dense region of white pixels or black pixels in the 7×7 pixel window.

The input image signal which is subjected to the digital halftone process by an error diffusion method or the like includes diffused black or white pixels. Therefore, if the input pixel which is subjected to the digital halftone process is the pixel to be processed, the judging signal 29 is at the low level. In the case where the input image signal indicates a character or a white character, there necessarily exists a dense region of black or white pixels around the pixel to be processed, so that the judging signal 29 is at the high level. As described above, the high level of the judging signal 29 circuit that the pixel to be processed is not included in the digital halftone image. The low level of the judging signal 29 means that the pixel to be processed is included in the digital halftone image. When the pixel to be processed is a character image which is not included in the digital halftone image, the selector 41 in FIGS. 2B and 2C selects the sub-pixel data 15 output from the edge smoothing circuit 14. When the pixel to be processed is included in the digital halftone image, the selector 41 selects the correcting signal 27.

Figure 21:
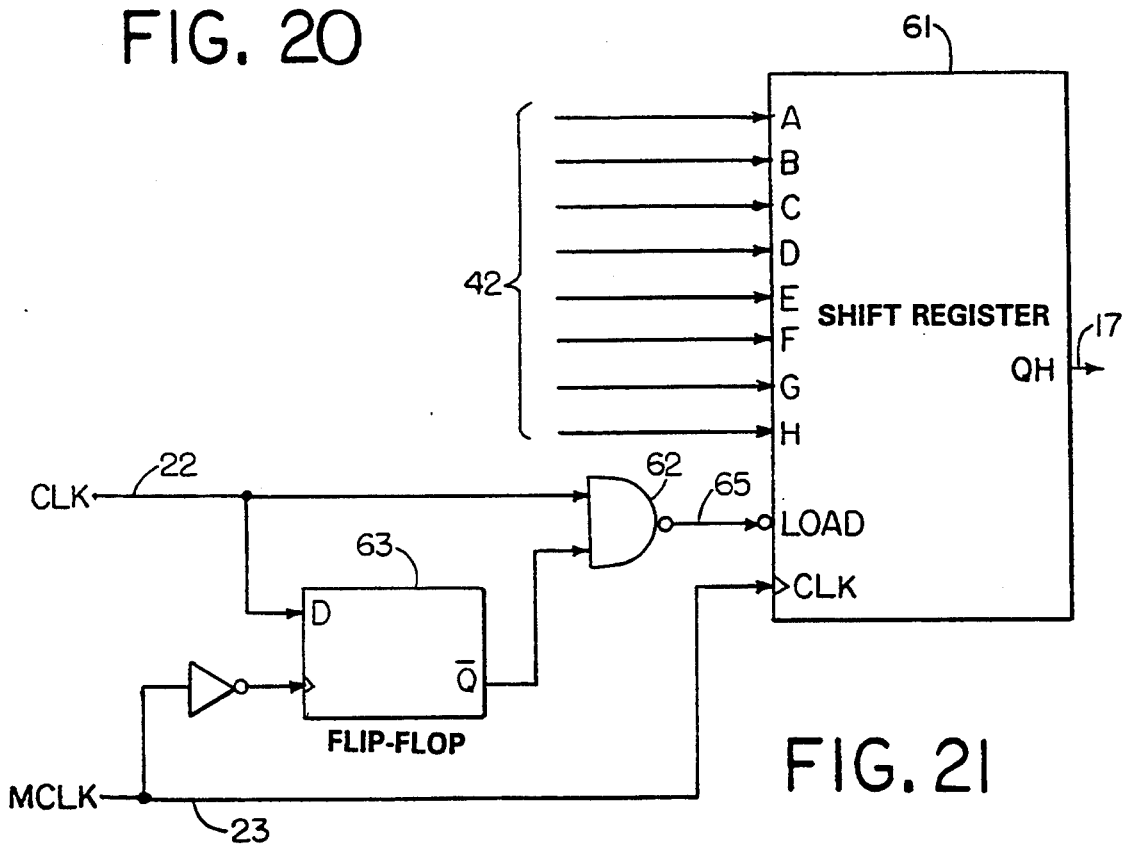
FIG. 21 is a block diagram showing a parallel-to-serial converter 16.
Figure 22:
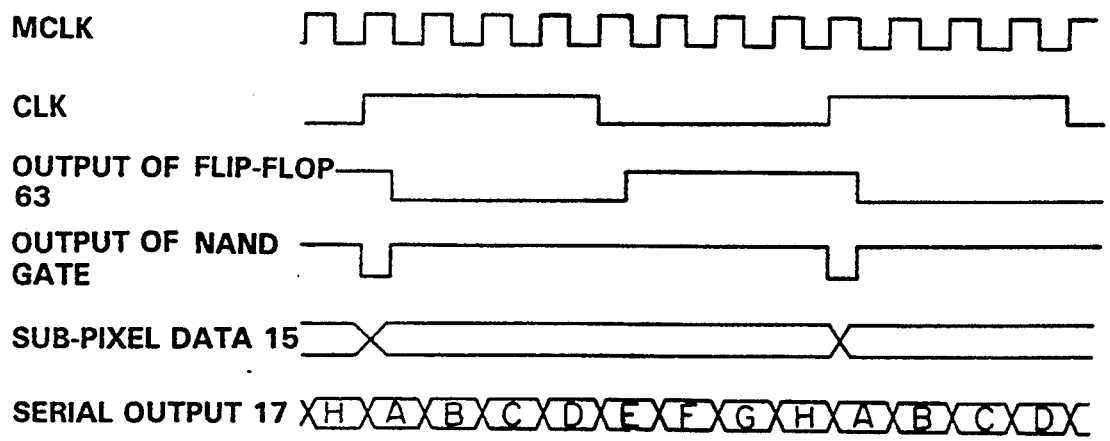
FIG. 22 is a timing diagram of the parallel-to-serial converter of FIG. 21.

Next, the parallel-to-serial converter 16 in FIGS. 2A to 2C will be described below. FIG. 21 shows a configuration of the parallel-to-serial converter 16. The parallel-to-serial converter 16 includes a shift register 61, a NAND gate 62 and a D flip-flop 63. FIG. 22 is a timing diagram of the parallel-to-serial converter 16 in FIG. 21. The shift register 61 receives a non-synchronous 8-bit parallel load input and outputs a serial output. The D flip-flop 63 inverts the pixel clock CLK 22 and delays the pixel clock CLK 22 by a half duration of the clock MCLK 23. The NAND gate 62 outputs a parallel load signal 65 at the rising edge of the pixel clock CLK 22. The parallel load signal 65 is a low pulse signal having a duration equal to a half duration of the clock MCLK 23. To the 8-bit parallel load input terminals A to H of the shift register 61, data 42 of 8 sub-pixels from the selector 41 are input. The data 42 of 8 sub-pixels which is synchronous with the pixel clock CLK 22 is output from the shift register 61 as a laser modulation signal 17 in a synchronous manner with the clock MCLK 23 which has a frequency eight times as high as that of the pixel clock CLK 22.

Figure 23:
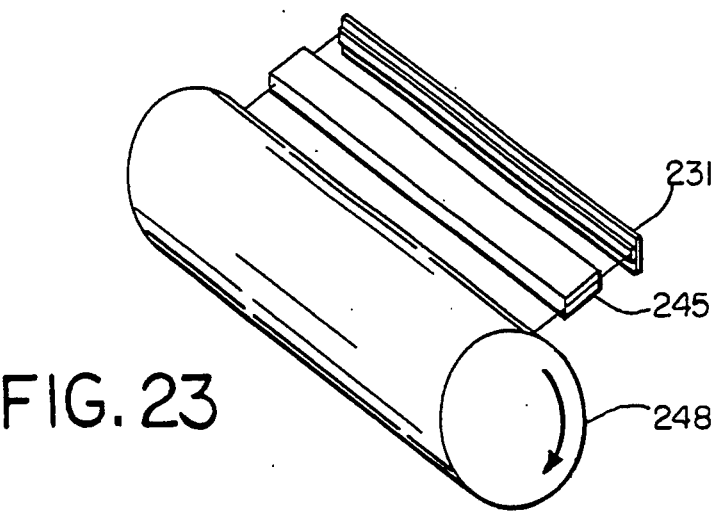
FIG. 23 is a schematic view showing the construction of a printing section of an LED printer.

FIG. 23 shows a construction of the printing portion of an LED printer for reproducing an image, based on the image signal which is processed by an image processing apparatus in the second example according to the invention. Light from an LED array 231 is converged on a photoconductive drum 248 by a rod lens array 245 for performing the scanning. The photoconductive drum 248 rotates in a direction indicated by an arrow in the figure. A latent image is formed on the photoconductive drum 248. An image is formed on a printing paper by a known electro-photographic method, based on the latent image on the photoconductive drum 248.

Figure 24:
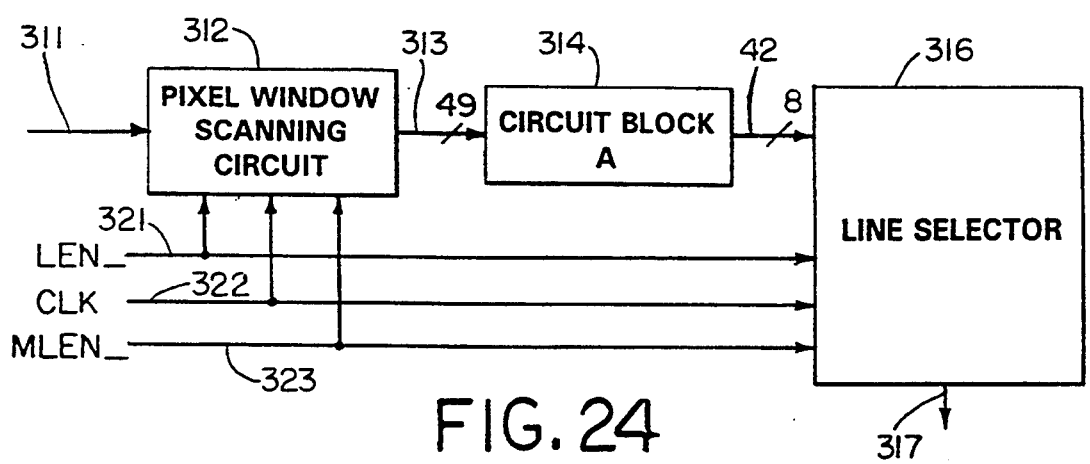
FIG. 24 is a schematic block diagram of an image processing apparatus in a second example according to the invention.

FIG. 24 shows a configuration of the image processing apparatus in the second example according to the invention. The image processing apparatus includes a pixel window scanning circuit 312, a circuit block A 314 and a line selector 316.

Figure 25:
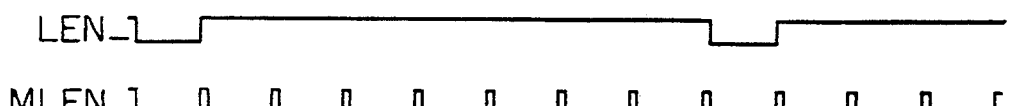
FIG. 25 is a timing diagram of a line enable signal LEN_ 321 and a master line enable signal MLEN_ 323.

Image data 311 obtained by raster scan is input into the pixel window scanning circuit 312 in a synchronous manner with the rising edge of a pixel clock CLK 322. A line enable signal LEN— 321 is an active-low signal indicative of an effective period of image data in one line. The line enable signal LEN— 321 is input into the pixel window scanning circuit 312. A master line enable signal MLEN— 323 is an active-low signal indicative of an effective period in one line when the pixel window scanning circuit 312 outputs the image data 313. The timing diagram of the line enable signal LEN— 321 and the master line enable signal MLEN— 323 is shown in FIG. 25. As is seen from FIG. 25, the master line enable signal MLEN— 323 becomes active 8 times in one period of the line enable signal LEN— 321.

The pixel window scanning circuit 312 outputs image data 313 of 7×7 pixels having a pixel to be processed at the center thereof. The pixel window scanning circuit 312 will be described later in detail.

The circuit block A 314 has the same configuration and function as those of the circuit block A in FIG. 2B. Therefore, the description thereof is omitted.

The line selector 316 sequentially selects the data 42 of 8 sub-pixels input in parallel for each line exposure of the LED, and outputs LED exposure data 317. The LED array performs the line exposure 8 times in one line period of the input image data. The line selector 316 will be described later. The LED exposure data 317 is applied to an LED array driving circuit of the LED printer which is not shown.

Figure 26:
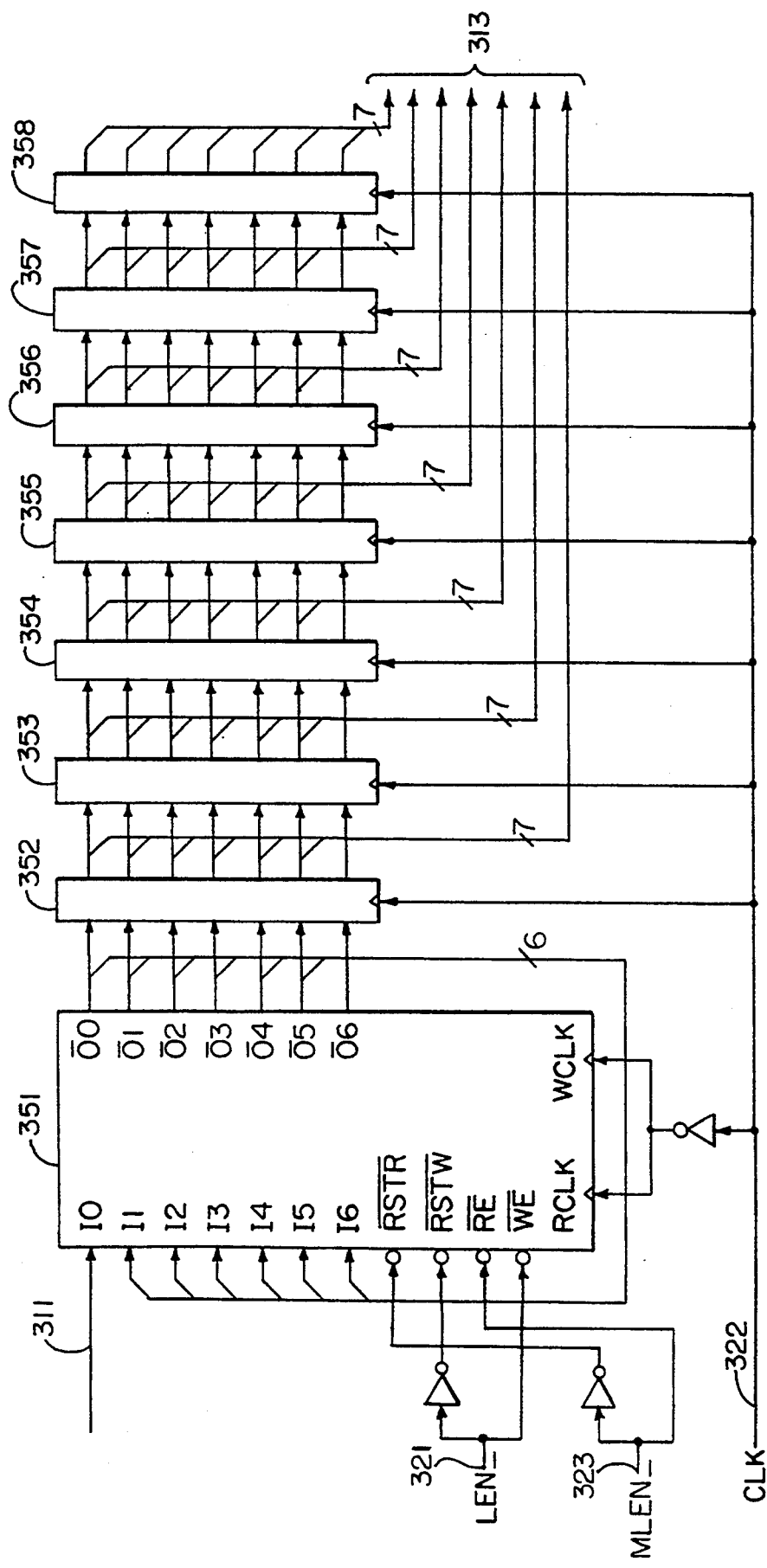
FIG. 26 is a block diagram showing a pixel window scanning circuit 312.

FIG. 26 shows a configuration of the pixel window scanning circuit 312. The pixel window scanning circuit 312 includes a line buffer memory 351 for inputting-/outputting data of 7-bit width and latches 352 to 358 each having 7 bit-width.

The operation of the pixel window scanning circuit 312 will be described with reference to FIG. 26. An inverted signal of the line enable signal LEN__ 321 is input into the write reset terminal $\overline{\text{RSTW}}$ of the line buffer memory 351. An inverted signal of the master line enable signal MLEN__ 323 is input into the read reset terminal $\overline{\text{RSTR}}$ of the line buffer memory 351. The line enable signal LEN__ 321 is input into the write enable terminal $\overline{\text{WE}}$ of the line buffer memory 351. The master line enable signal MLEN__ 323 is input into the read enable terminal $\overline{\text{RE}}$ of the line buffer memory 51. An inverted signal of the pixel clock CLK 322 is input into the read clock terminal RCLK and the write clock terminal WCLK of the line buffer memory 351.

The line buffer memory 351 receives the image data 311 at the data input terminal $I_0$ and outputs an image signal which is delayed by 1 line at the data output terminal $\overline{O}_0$. The image signal which is delayed by 1 line and output from the data output terminal $\overline{O}_0$ is input to the data input terminal $I_1$. Then, the line buffer memory 351 outputs an image signal which is delayed by 2 lines from the image data 311 at the output terminal $\overline{O}_1$. Similarly, the line buffer memory 351 outputs image signals which are delayed by 3 lines, 4 lines, 5 lines, 6 lines and 7 lines from the image data 311 at the output terminals $\overline{O}_2$, $\overline{O}_3$, $\overline{O}_4$, $\overline{O}_5$, and $\overline{O}_6$, respectively. Each of latches 352 to 358 latches the line-delayed image signals from the line buffer memory 351 and delays each image signal by 1 pixel. The read enable terminal of the line buffer memory 351 outputs the same data 8 times based on the master line enable signal MLEN__, when image signal 311 for one line is input. With the above-described configuration, the pixel window scanning circuit 312 outputs the image data 313 of 49 pixels in the 7×7 pixel window.

Figures 27, 28, 29, 30:
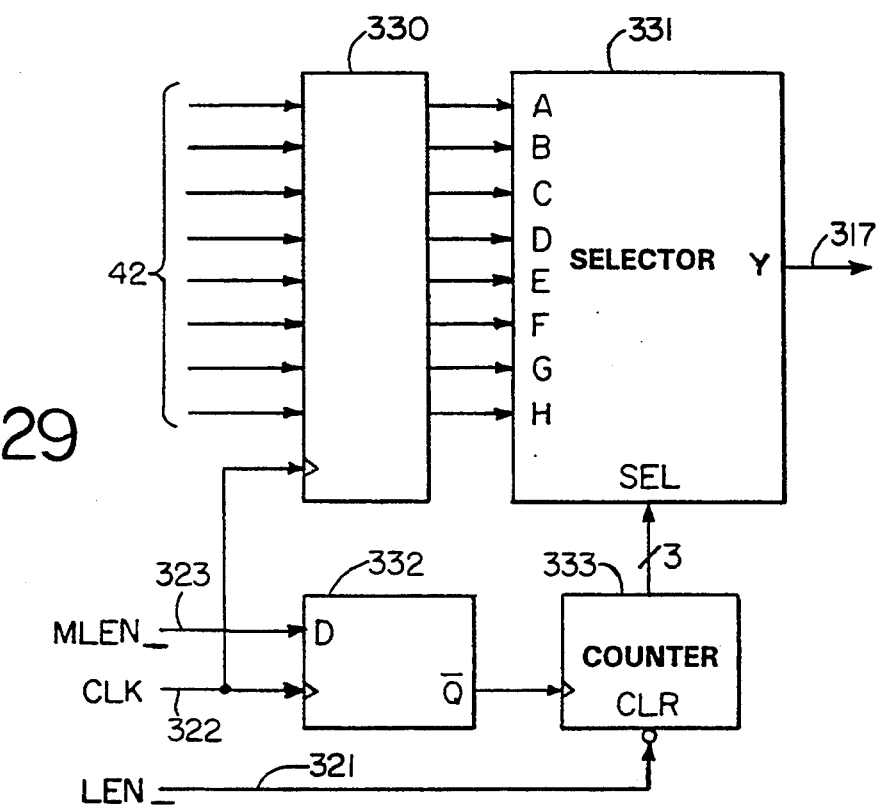
FIG. 27 shows numbered pixels in image data 13 of 7×7 pixel window shown in FIGS. 2A to 2C.
FIG. 28 shows a pixel arrangement input into a block A 314 in FIG. 24.
FIG. 29 is a block diagram of a line selector 316.
FIG. 30 is a timing diagram in the line selector of FIG. 29.

In the first example, the laser printer is employed as the printer for reproducing an image. Accordingly, data of one pixel is divided into 8 sub-pixels along the main-scanning direction. In the second example, the LED printer is employed, so that data of one pixel is divided into 8 sub-pixels along the sub-scanning direction. Therefore, the operations of the edge smoothing circuit in the second example are different from those in the first example only in that the operation in the main-scanning direction is interchanged with the operation in the sub-scanning direction. FIG. 27 shows numbered pixels of the image data 13 in the 7×7 pixel window in FIGS. 2A to 2C. The image data arrangement shown in FIG. 27 is rearranged into that shown in FIG. 28 and input into the circuit block A 314 in FIG. 24. As a result, it is found that the circuit block A 314 in FIG. 24 can have the same circuitry as that of the circuit block A in FIG. 2B. The operation of the circuit block A 314 is identical with that of the circuit block A in the first example, so that the description thereof is omitted.

The line selector 316 in FIG. 24 will be described with reference to FIG. 29. FIG. 29 shows a configuration of the line selector 316. The line selector 316 includes a latch 330, a selector 331, a D flip-flop 332 and a counter 333. FIG. 30 is a timing diagram of the line selector 316 shown in FIG. 29. The latch 330 latches the data 42 of 8 sub-pixels at the rising edge of the pixel clock CLK 322. The D flip-flop 332 inverts the master line enable signal MLEN__ 323 and delays it by one pixel clock. The counter 333 is a 3-bit binary counter with a synchronous clear input. To the clear input of the counter 333, the line enable LEN__ 321 is input. The counter 333 is cleared by the line enable signal LEN__ 321, and counts up from 0 to 7 by the output signal of the D flip-flop 332. The selector 331 is an 8-to-1 selector. The selector 331 receives data of 8 sub-pixels output from the latch 330. The selector 331 selects one of the 8 inputs depending on the output value of the counter 333, and outputs an LED exposure data 317.

As is apparent from the above description, the pixel window scanning circuit 312 outputs the same pixel window data 313 for 8 line scans of the master line enable signal MLEN__ 323 until the line enable LEN__ 321 is made to be active again. The circuit block A 314 also outputs the same sub-pixel data 42 for 8 line scans of the master line enable signal MLEN__. The line selector 316 sequentially selects the data 42 of 8 sub-pixels for one line of the input image data in response to the master line enable signal MLEN__ 323, and outputs the LED exposure data 317 for 8 lines. Thus, based on the input image data of one line, the exposure data for 8 lines is obtained. By using the exposure data for 8 lines, the LED array performs the exposure in such a manner that one line is divided into 8 lines.

In the case where the LED printer is employed as the printer for reproducing an image, instead of the laser printer, as in the second example, the edge smoothing effect and the reproducibility of thin lines and isolated dots can be improved and also the tone characteristic of the digital halftone image can be improved as in the first example.

Figure 31:
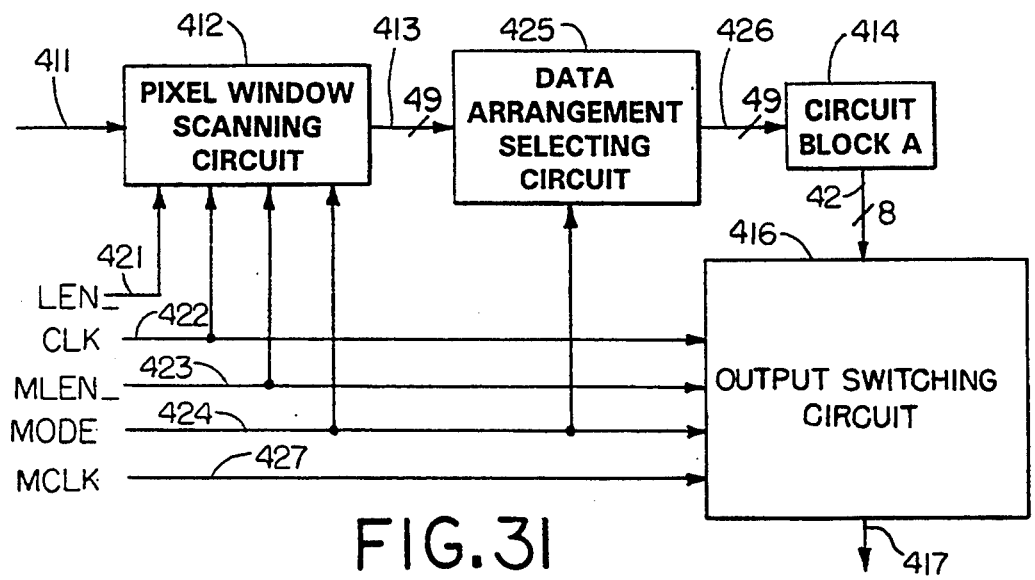
FIG. 31 is a schematic block diagram of an image processing apparatus in a third example according to the invention.

FIG. 31 shows a configuration of an image processing apparatus in the third example according to the invention. The image processing apparatus includes a pixel window scanning circuit 412, a data arrangement selecting circuit 425, a circuit block A 414, and an output switching circuit 416. An output mode switching signal MODE 424 is a signal for setting a type of printer for reproducing the image data. The mode switching signal MODE 424 is made at a high level when a laser printer is used, and is made at a low level when an LED printer is used.

Image data 411 obtained by raster scan is input into the pixel window scanning circuit 412 in a synchronous manner with the rising edge of a pixel clock CLK 422. A line enable signal LEN__ 421 is an active-low signal indicative of an effective period of the image data 411 in one line. The line enable signal LEN__ 421 is input into the pixel window scanning circuit 412. A master line enable signal MLEN__ 423 is an active-low signal indicative of an effective period in one line when the pixel window scanning circuit 412 outputs the image data 413. The master line enable signal MLEN__ 423 is the same as that in the second example in the case of the LED printer. If the laser printer is used as the reproducing printer, the master line enable signal MLEN__ 423 is the same signal as the line enable signal LEN__ 421.

The pixel window scanning circuit 412 outputs the image data 413 of 7×7 pixels having a pixel to be processed at the center. The configuration of the pixel window scanning circuit 412 is the same as that of the pixel window scanning circuit 312 shown in FIG. 26 in the second example, so that the description thereof is omitted.

The data arrangement selecting circuit 425 receives the image data 413 of 49 pixels in the 7×7 pixel window. The data arrangement selecting circuit 425 outputs the data with the arrangement of 7×7 pixels the same as in the first example (FIG. 27), when the mode switching signal MODE 424 is at the high level. When the mode switching signal MODE 424 is at the low level, the data arrangement selecting circuit 425 outputs the data with the arrangement the same as in the second example (FIG. 28). As described above, the data arrangement selecting circuit 425 outputs image data 426 of 7×7 pixels with the data arrangement determined by the mode switching signal MODE 424.

The circuit block A 414 is identical with the circuit block A in FIG. 2B. To the circuit block A 414, the image data 426 of 7×7 pixels are input. The circuit block A 414 converts the input data of the center pixel into data 42 of 8 sub-pixels, and output them in parallel.

Figure 32:
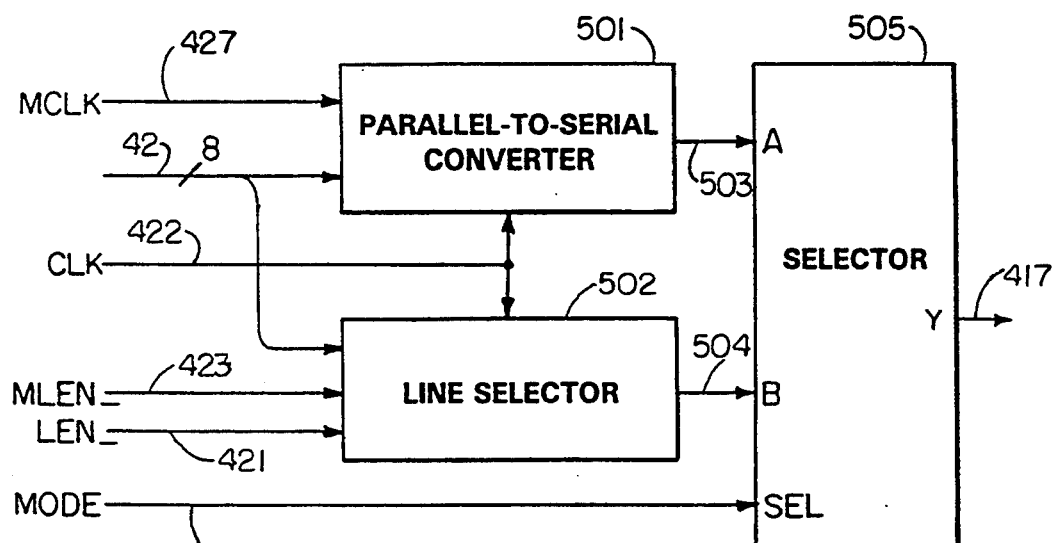
FIG. 32 is a block diagram showing an input switching circuit 416.
Figure 33:
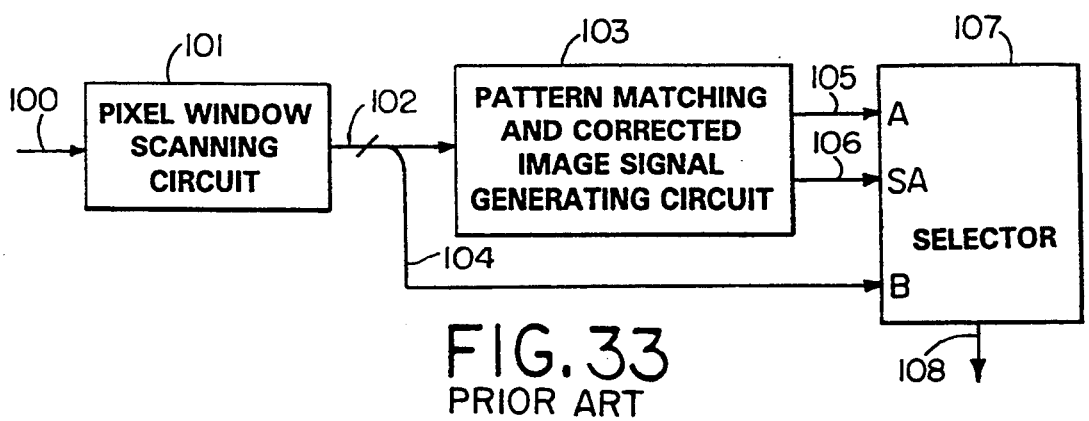
FIG. 33 is a block diagram showing an image processing apparatus which performs a conventional edge smoothing process.
Figure 34A:
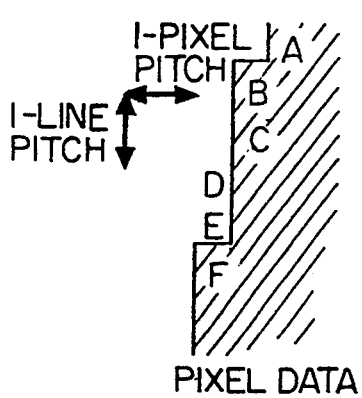
FIGS. 34A to 34D show the edge smoothing process.
Figure 34B:
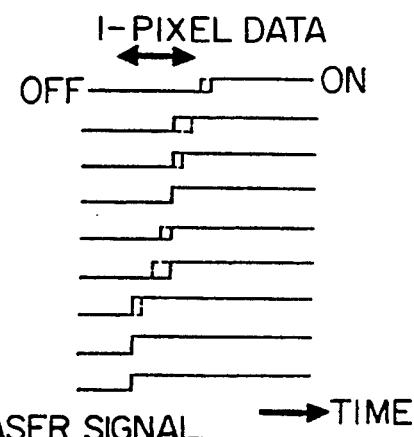
Figure 34C:
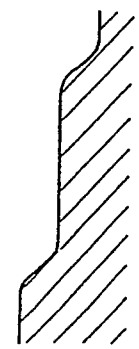
Figure 34D:
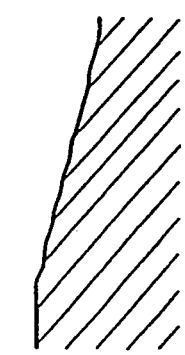

FIG. 32 shows a configuration of the output switching circuit 416. The output switching circuit 416 includes a parallel-to-serial converter 501, a line selector 502, and a selector 505. The parallel-to-serial converter 501 is the same as the parallel-to-serial converter 16 in the first example. The parallel-to-serial converter 501 converts the data 42 of 8 sub-pixels into a serial data row, and outputs a laser modulation signal 503. The line selector 502 is the same as the lane selector 316 in the second example. The line selector 502 sequentially selects the data 42 of 8 sub-pixels input in parallel for each line exposure of the LED array and outputs an LED exposure data 504. The selector 505 selects the laser modulation signal 507 when the mode switching signal MODE 424 is at a high level, and selects the LED exposure data 504 when the mode switching signal MODE 424 is at a low level. Data 417 is applied to a laser driving circuit or an LED array driving circuit which is not shown. When the laser printer is used, i.e., when the signal MODE 424 is at a high level, it is unnecessary to input the signals LEN_ 421 and MLEN_ 423 into the output switching circuit 416. When the LED printer is used, i.e., when the signal MODE 424 is at a low level, it is unnecessary to input the clock signal MCLK 427 into the output switching circuit 416.

By setting the mode signal MODE 424, the image processing apparatus in the third example can be applied to both the laser printer and the LED printer. It is effective that the image processing apparatus in the third example is realized by an LSI.

In the above examples, the cases of the LED printer are described. Alternatively, another case where a printer using an array image printing head such as a liquid crystal shutter array or a thermal head can attain the same effects.

In the above examples, printers are used as the image reproducing device. Alternatively, a case where a CRT is used as the image reproducing device can attain the same effects.

As described above, according to the image processing apparatus of the invention, isolated dots and thin lines of 1-dot width can accurately be reproduced, and an edge smoothing effect superior to that attained by the conventional process can be attained without causing the reproduced font images to be fatted or smothered out. Even if the input image data is the digital halftone image, any pseudo-contour or moire does not occur, so that the tone reproducing characteristic can be improved. In addition, even when the input image data includes both the font image and the digital halftone image, both the edge smoothing process for the font image and the process for improving the tone reproducing characteristic for the digital halftone image can be applied.

Moreover, for the printer which reproduces an image, either laser beam printers or LED printers can be used as required.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed

1. An image processing method for smoothing edges in a reproduced image, said image processing method comprising the steps of:
generating image data including a specified pixel and a plurality of pixels surrounding said specified pixel;
dividing said specified pixel included in said image data into N sub-pixels;
detecting the condition of said specified pixel and the condition of said plurality of pixels surrounding said specified pixel included in said image data by matching said image data with a plurality of predetermined patterns;
generating sub-pixel data for determining the number and position of sub-pixels to be exposed of said N sub-pixels, based on the condition of said specified pixel and the condition of said plurality of pixels surrounding said specified pixel; and
supplying said sub-pixel data to exposure means which makes exposure,
wherein said step of generating sub-pixel data includes a step of generating sub-pixel data for exposing M sub-pixels of said N sub-pixels, when said specified pixel is detected to be an exposed pixel which requires no exposure correction, M being smaller than N.

2. An image processing method according to claim 1, wherein said step of generating sub-pixel data includes a step of generating sub-pixel data for exposing L sub-pixels of said N sub-pixels, when said specified pixel is detected to be an exposed pixel and to be included in a thin line, L being larger than M.

3. An image processing method according to claim 1, wherein said step of generating sub-pixel data includes a step of generating sub-pixel data for exposing L sub-pixels of said N sub-pixels, when said specified pixel is detected to be an exposed pixel and to be an isolated dot pixel, L being larger than M.

4. An image processing method according to claim 1, wherein said step of generating sub-pixel data includes a step of generating sub-pixel data for exposing I sub-pixels of said N sub-pixels, when said specified pixel is detected to be adjacent to a non-exposed pixel included in a reversed thin line, I being smaller than M.

5. An image processing method according to claim 1, wherein said step of generating sub-pixel data includes a step of generating sub-pixel data for exposing I sub-pixels of said N sub-pixels, when said specified pixel is detected to be adjacent to a non-exposed pixel of a reversed isolated dot, I being smaller than M.

6. An image processing apparatus for smoothing edges in a reproduced image, comprising:
image data generating means for generating image data including a specified pixel and a plurality of pixels surrounding said specified pixel;

sub-pixel data generating means for dividing said specified pixel included in said image data into N sub-pixels, for detecting the condition of said specified pixel and the condition of said plurality of pixels surrounding said specified pixel included in said image data by matching said image data with a plurality of predetermined patterns, and for generating sub-pixel data for determining the number and position of sub-pixels to be exposed of said N sub-pixels, based on the condition of said specified pixel and the condition of said plurality of pixels surrounding said specified pixel; and supplying means for supplying said sub-pixel data to exposure means which makes exposure, wherein said sub-pixel data generating means generates sub-pixel data for exposing M sub-pixels of said N sub-pixels, when said specified pixel is detected to be an exposed pixel which requires no exposure correction, M being smaller than N.

7. An image processing apparatus according to claim 6, wherein said sub-pixel data generating means generates sub-pixel data for exposing L sub-pixels of said N sub-pixels, when said specified pixel is detected to be an exposed pixel and to be included in a thin line, L being larger than M.

8. An image processing apparatus according to claim 6, wherein said sub-pixel data generating means generates sub-pixel data for exposing L sub-pixels of said N sub-pixels, when said specified pixel is detected to be an exposed pixel and to be an isolated dot pixel, L being larger than M.

9. An image processing apparatus according to claim 6, wherein said sub-pixel data generating means generates sub-pixel data for exposing I sub-pixels of said N sub-pixels, when said specified pixel is detected to be adjacent to a non-exposed pixel included in a reversed thin line, I being smaller than M.

10. An image processing apparatus according to claim 6, wherein said sub-pixel data generating means generates sub-pixel data for exposing I sub-pixels of said N sub-pixels, when said specified pixel is detected to be adjacent to a non-exposed pixel of a reversed isolated dot, I being smaller than M.

11. An image processing apparatus according to claim 6, wherein said image processing apparatus further comprises means for switching a first mode for outputting said sub-pixel data from said sub-pixel data generating means in serial and a second mode for outputting said sub-pixel data from said sub-pixel data generating means sequentially by each separate line.

12. An image processing apparatus for smoothing edges in a reproduced image, comprising:

image data generating means for generating image data including a specified pixel and a plurality of pixels surrounding said specified pixel;

first sub-pixel data generating means for dividing said specified pixel included in said image data into N sub-pixels, for detecting the condition of said specified pixel and the condition of said plurality of pixels surrounding said specified pixel included in said image data by matching said image data with a plurality of predetermined patterns, and for generating first sub-pixel data for determining the number and position of sub-pixels to be exposed of said N sub-pixels, based on the condition of said specified pixel and the condition of said plurality of pixels surrounding said specified pixel;

average density calculating means for calculating an average density of said image data;

second sub-pixel data generating means for dividing said specified pixel included in said image data into N sub-pixels, and for generating second sub-pixel data for determining the number and position of sub-pixels to be exposed of said N sub-pixels, based on the condition of said specified pixel and the average density of said image data calculated by said average density calculating means;

judging means for judging whether said image data includes at least one of dense regions of exposed pixels and dense regions of non-exposed pixels or not;

selecting means, receiving said first sub-pixel data and said second sub-pixel data, for selecting said first sub-pixel data when said judging means judges that the image data includes at least one of dense regions of exposed pixels and dense regions of non-exposed pixels, and for selecting said second sub-pixel data when said judging means judges that the image data includes none of dense regions of exposed pixels and dense regions of non-exposed pixels; and supplying means for supplying one of said first sub-pixel data and said second sub-pixel data selected by said selecting means to exposure means which makes exposure.

13. An image processing apparatus according to claim 12, wherein said first sub-pixel data generating means generates sub-pixel data for exposing M sub-pixels of said N sub-pixels, when said specified pixel is detected to be an exposed pixel which requires no exposure correction, M being smaller than N.

14. An image processing apparatus according to claim 12, wherein said average density calculating means receives a portion of said image data including said specified pixel and at least one of said plurality of pixels surrounding said specified pixel, and calculates the number of exposed pixels included in said portion of said image data as an average density of said image data.

15. An image processing apparatus according to claim 14, wherein said portion of said image data is a region having pixels of P rows and Q columns including said specified pixel.

16. An image processing apparatus according to claim 12, wherein said second sub-pixel data generating means includes means for generating a probability signal having a first value or a second value depending on a predetermined probability, for said specified pixel, and means for generating second sub-pixel data for determining the number and position of sub-pixels to be exposed of said N sub-pixels, based on the condition of said specified pixel, the average density of said image data, and the probability signal.

17. An image processing apparatus according to claim 12, wherein said image processing apparatus further comprises means for switching a first mode for outputting said sub-pixel data from said selecting means in serial and a second mode for outputting said sub-pixel data from said selecting means sequentially by each separate line.

18. An image processing apparatus for smoothing edges in a reproduced image, comprising:

image data generating means for generating image data including a specified pixel and a plurality of pixels surrounding said specified pixel;

first sub-pixel data generating means for dividing said specified pixel included in said image data into N sub-pixels, for generating first sub-pixel data for exposing M sub-pixels of said N sub-pixels, M being smaller than N, when said specified pixel is a exposed pixel, and for generating first sub-pixel data for non-exposing all of N sub-pixels when said specified pixel is a non-exposed pixel;

average density calculating means for calculating an average density of said image data;

second sub-pixel data generating means for dividing said specified pixel included in said image data into N sub-pixels, and for generating second sub-pixel data for determining the number and position of sub-pixels to be exposed of said N sub-pixels, based on the condition of said specified pixel and the average density of said image data calculated by said average density calculating means;

judging means for judging whether said image data includes at least one of dense regions of exposed pixels and dense regions of non-exposed pixels or not;

selecting means, receiving said first sub-pixel data and said second sub-pixel data, for selecting said first sub-pixel data when said judging means judges that the image data includes at least one of dense regions of exposed pixels and dense regions of non-exposed pixels, and for selecting said second sub-pixel data when said judging means judges that the image data includes none of dense regions of exposed pixels and dense regions of non-exposed pixels; and supplying means for supplying one of said first sub-pixel data and said second sub-pixel data selected by said selecting means to exposure means which makes exposure.

19. An image processing apparatus according to claim 18, wherein said average density calculating means receives a portion of said image data including said specified pixel and at least one of said plurality of pixels surrounding said specified pixel, and calculates the number of exposed pixels included in said portion of said image data as an average density of said image data.

20. An image processing apparatus according to claim 19, wherein said portion of said image data is a region having pixels of P rows and Q columns including said specified pixel.

21. An image processing apparatus according to claim 18, wherein said second sub-pixel data generating means includes means for generating a probability signal having a first value or a second value depending on a predetermined probability, for said specified pixel, and means for generating second sub-pixel data for determining the number and position of sub-pixels to be exposed of said N sub-pixels, based on the condition of said specified pixel, the average density of said image data, and the probability signal.

22. An image processing apparatus according to claim 18, wherein said image processing apparatus further comprises means for switching a first mode for outputting said sub-pixel data from said selecting means in serial and a second mode for outputting said sub-pixel data from said selecting means sequentially by each separate line.

* * * * *